US012684585B2

(12) United States Patent
Ang et al.

(10) Patent No.: US 12,684,585 B2
(45) Date of Patent: Jul. 14, 2026

(54) CROSS-SLOT SCHEDULING FOR CROSS NUMEROLOGY

(71) Applicant: QUALCOMM Incorporated, San Diego, CA (US)

(72) Inventors: Peter Pui Lok Ang, San Diego, CA (US); Huilin Xu, Temecula, CA (US); Wooseok Nam, San Diego, CA (US); Gabi Sarkis, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 18/308,822

(22) Filed: Apr. 28, 2023

(65) Prior Publication Data

US 2023/0269747 A1     Aug. 24, 2023

Related U.S. Application Data

(63) Continuation of application No. 16/877,371, filed on May 18, 2020, now abandoned.
(Continued)

(51) Int. Cl.
*H04W 72/23*        (2023.01)
*H04L 1/1607*       (2023.01)
(Continued)

(52) U.S. Cl.
CPC .......... *H04W 72/23* (2023.01); *H04L 1/1642* (2013.01); *H04W 24/08* (2013.01); *H04W 52/0229* (2013.01); *H04W 72/0446* (2013.01)

(58) Field of Classification Search
CPC ............. H04W 72/23; H04W 72/0446; H04W 72/0457; H04W 24/08; H04W 52/0229;
(Continued)

(56) References Cited

U.S. PATENT DOCUMENTS

| | | | |
|---|---|---|---|
| 10,375,718 B2 | 8/2019 | Manolakos et al. | |
| 2018/0131482 A1 | 5/2018 | Zhou et al. | |

(Continued)

FOREIGN PATENT DOCUMENTS

| | | |
|---|---|---|
| WO | WO-2018031267 | 2/2018 |
| WO | WO-2018175805 A1 | 9/2018 |
| WO | WO-2018175820 A1 | 9/2018 |

OTHER PUBLICATIONS

Qualcomm Incorporated: "Cross-Slot Scheduling Power Saving Techniques", 3GPP TSG-RAN WG1 #97, R1-1907295, Reno, USA, May 13-May 17, 2019, May 4, 2019, pp. 1-16.
(Continued)

*Primary Examiner* — Ricardo H Castaneyra
(74) *Attorney, Agent, or Firm* — Holland & Hart LLP/Qualcomm Incorporated

(57)                ABSTRACT

Methods, systems, and devices for wireless communications are described. A user equipment (UE) may identify a scheduling offset threshold corresponding to a cross-slot grant. The UE may monitor a control channel in a first slot for the cross-slot grant, the control channel having a first numerology that is different than a second numerology of a shared channel and determine a beginning slot defined in the second numerology based on interpreting the scheduling offset threshold as being defined in the first numerology or the second numerology. The UE may then enter a low power state, or communicating a data transmission, during the beginning slot based on whether the cross-slot grant is detected.

30 Claims, 20 Drawing Sheets

Related U.S. Application Data

(60) Provisional application No. 62/852,959, filed on May 24, 2019.

(51) Int. Cl.

| | | |
|---|---|---|
| *H04W 24/08* | (2009.01) | |
| *H04W 52/02* | (2009.01) | |
| *H04W 72/0446* | (2023.01) | |

(58) Field of Classification Search
CPC ... H04L 1/1642; H04L 5/0007; H04L 5/0053; H04L 5/001; H04L 5/0092; H04L 27/26025; Y02D 30/70
USPC .............. 370/329, 336, 330, 252, 278, 311; 455/450
See application file for complete search history.

(56) References Cited

U.S. PATENT DOCUMENTS

| | | | |
|---|---|---|---|
| 2018/0192383 A1 | 7/2018 | Nam et al. | |
| 2018/0279360 A1 | 9/2018 | Park et al. | |
| 2019/0090261 A1 * | 3/2019 | Yang ................. | H04W 72/0446 |
| 2019/0253220 A1 * | 8/2019 | Kim .................... | H04W 72/046 |
| 2019/0350048 A1 | 11/2019 | Kim et al. | |
| 2019/0363857 A1 * | 11/2019 | Hwang ................... | H04L 5/001 |
| 2020/0008233 A1 | 1/2020 | Xiong et al. | |
| 2020/0022175 A1 | 1/2020 | Xiong et al. | |
| 2020/0374918 A1 | 11/2020 | Ang et al. | |
| 2021/0136808 A1 * | 5/2021 | Yang ....................... | H04L 5/001 |

OTHER PUBLICATIONS

Qualcomm Incorporated: "Cross-Slot Scheduling Power Saving Techniques", 3GPP TSG-RAN WG1 #98bis, R1-1911130, Chongqing, China, Oct. 14-Oct. 20, 2019, Oct. 5, 2019, pp. 1-18.
International Preliminary Report on Patentability—PCT/US2020/033632 The International Bureau of WIPO—Geneva, Switzerland, Dec. 2, 2021 (192991WO).
International Search Report and Written Opinion—PCT/US2020/033632—ISA/EPO—Sep. 2, 2020 (192991WO).
Qualcomm Incorporated: "Cross-Slot Scheduling Power Saving Techniques", 3GPP Draft, 3GPP TSG-RAN WG1 #97, R1-1907295 Cross-Slot Scheduling Power Saving Techniques, 3rd Generation Partnership Project (3GPP), Mobile Competence Centre, 650, Route Des Lucioles, F-06921 Sophia-Antipolis Cedex, France, vol. RAN WG1, No. Reno, USA, May 13-May 17, 2019, May 13, 2019 (May 13, 2019), XP051728735, 16 pages, page 1 p. 3 p. 6 p. 11, paragraph [0001]-paragraph [0002].
Qualcomm Incorporated: "Cross-Carrier Scheduling with Different Numerologies", 3GPP TSG-RAN WG1 #97, R1-1907304, Reno, USA, May 13-17, 2019, pp. 1-9.
Mediatek Inc: "Summary of Cross-slot Scheduling Power-Saving Techniques", 3GPP TSG RAN WG1 Meeting #97, R1-190XXXX (R1-1907918), Reno, NV, USA, May 13-17, 2019, May 20, 2019, 26 Pages.
Mediatek Inc: "Summary of Offline on Cross-Slot Scheduling", 3GPP TSG RAN WG1 Meeting #96-Bis, R1-1905819, Xi'an, China, Apr. 8-12, 2019, Apr. 15, 2019, 12 Pages.
NOKIA, et al., "Feature Lead Summary on Cross-carrier Scheduling with Different Numerologies", 3GPP TSG RAN WG1 Meeting #96, R1-1903695, Athens, Greece, Feb. 25, 2024-Mar. 1, 2024, 17 Pages.
OPPO: "On Procedure for Cross-slot Scheduling", 3GPP TSG RAN WG1 #96bis, R1-1905049, Xi'an, China, Apr. 8, 2019-Apr. 12, 2019, 5 Pages.

* cited by examiner

Slot Offset Relative to Mapped Slot

Communications Manager

Scheduling Offset Threshold
Identifying Component

820

Control Channel Monitoring
Component

825

Receiver

810

Beginning Slot Determining
Component

830

Low Power State Component

835

815

Transmitter

840

805

800

Scheduling Offset Threshold Identifying Component

910

Beginning Slot Determining Component

920

Cross-slot Grant Receiving Component

930

Control Channel Monitoring Component

915

Low Power State Component

925

Multiple Cross-slot Grant Component

935

905

900

1110

1115

1120

1105

1100

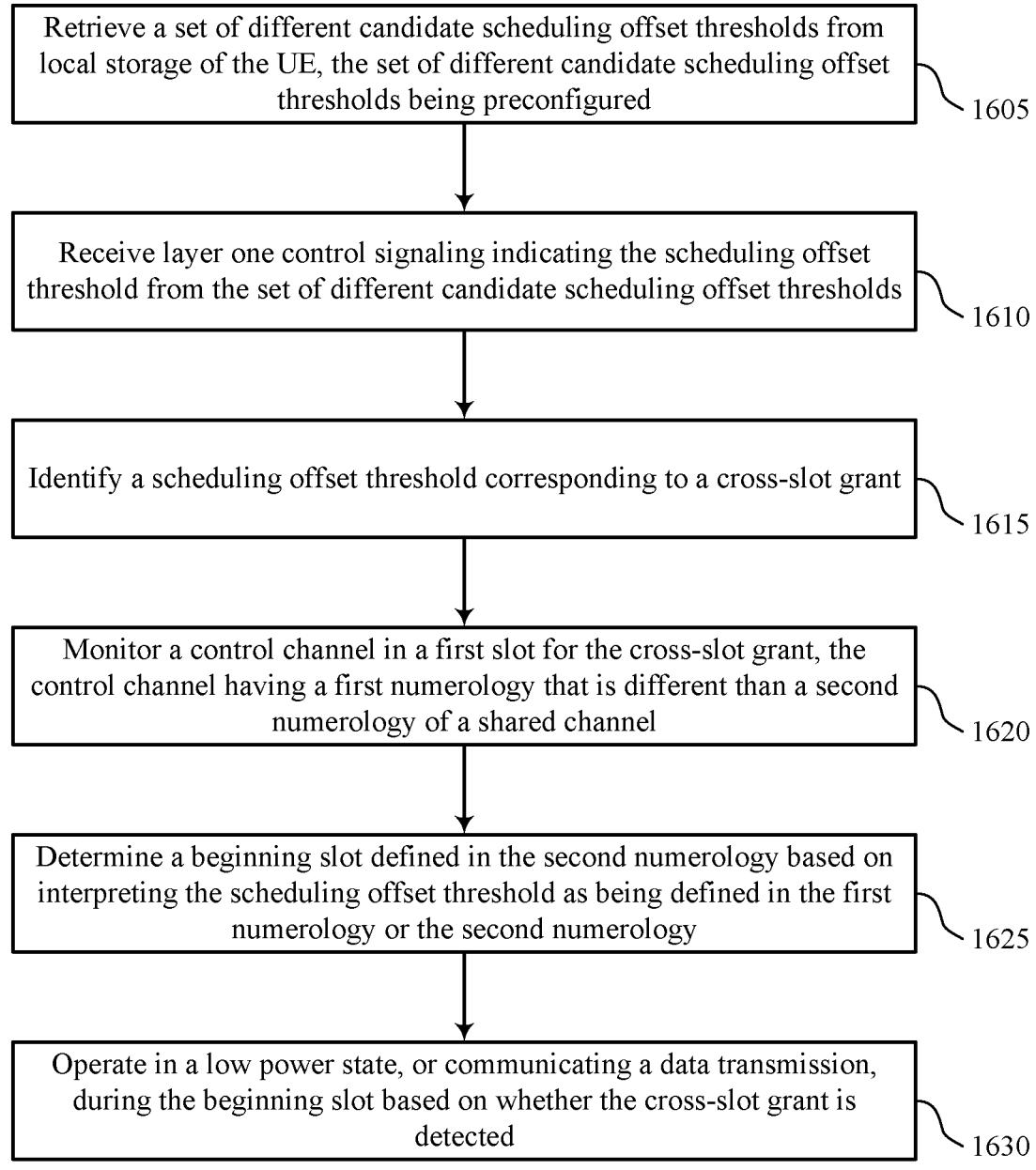

Retrieve a set of different candidate scheduling offset thresholds from local storage of the UE, the set of different candidate scheduling offset thresholds being preconfigured

1605

Receive layer one control signaling indicating the scheduling offset threshold from the set of different candidate scheduling offset thresholds

1610

Identify a scheduling offset threshold corresponding to a cross-slot grant

1615

Monitor a control channel in a first slot for the cross-slot grant, the control channel having a first numerology that is different than a second numerology of a shared channel

1620

Determine a beginning slot defined in the second numerology based on interpreting the scheduling offset threshold as being defined in the first numerology or the second numerology

1625

Operate in a low power state, or communicating a data transmission, during the beginning slot based on whether the cross-slot grant is detected

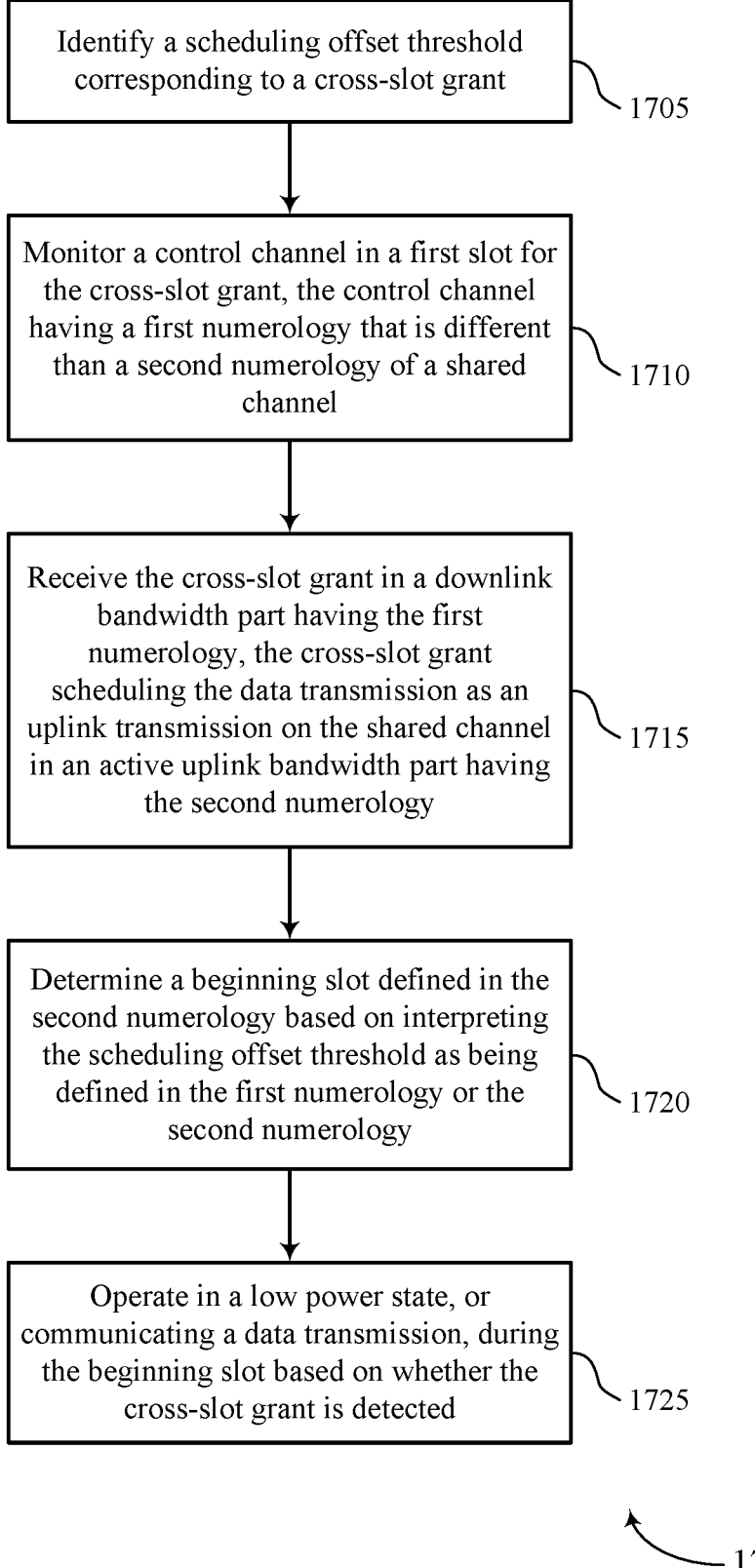

Identify a scheduling offset threshold corresponding to a cross-slot grant

1705

Monitor a control channel in a first slot for the cross-slot grant, the control channel having a first numerology that is different than a second numerology of a shared channel

1710

Receive the cross-slot grant in a downlink bandwidth part having the first numerology, the cross-slot grant scheduling the data transmission as an uplink transmission on the shared channel in an active uplink bandwidth part having the second numerology

1715

Determine a beginning slot defined in the second numerology based on interpreting the scheduling offset threshold as being defined in the first numerology or the second numerology

1720

Operate in a low power state, or communicating a data transmission, during the beginning slot based on whether the cross-slot grant is detected

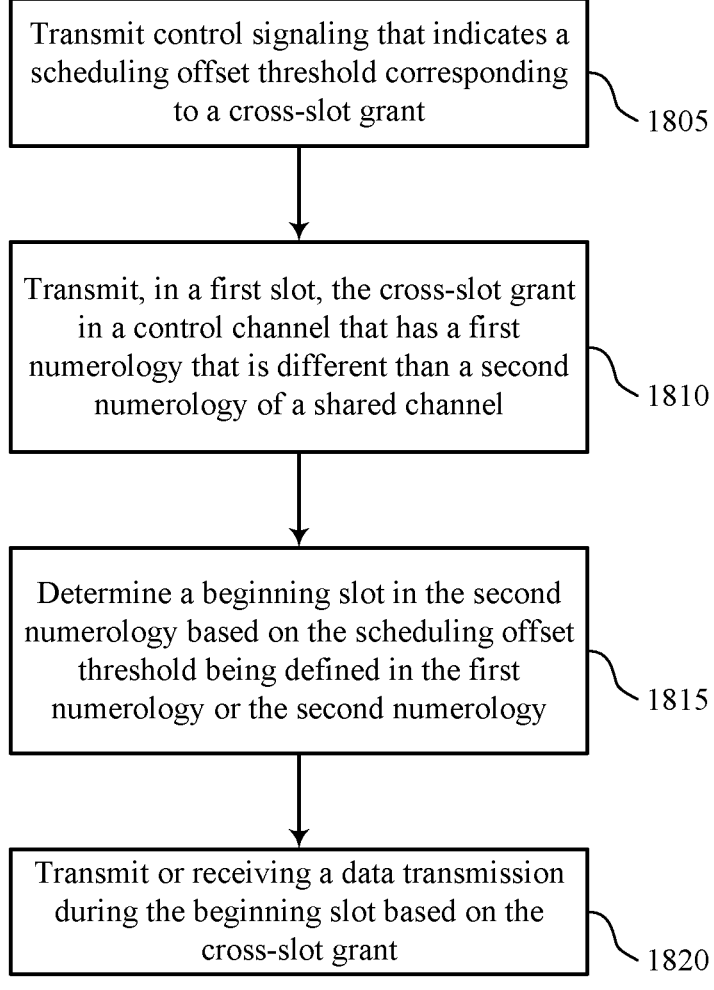

Transmit control signaling that indicates a scheduling offset threshold corresponding to a cross-slot grant

1805

Transmit, in a first slot, the cross-slot grant in a control channel that has a first numerology that is different than a second numerology of a shared channel

1810

Determine a beginning slot in the second numerology based on the scheduling offset threshold being defined in the first numerology or the second numerology

1815

Transmit or receiving a data transmission during the beginning slot based on the cross-slot grant

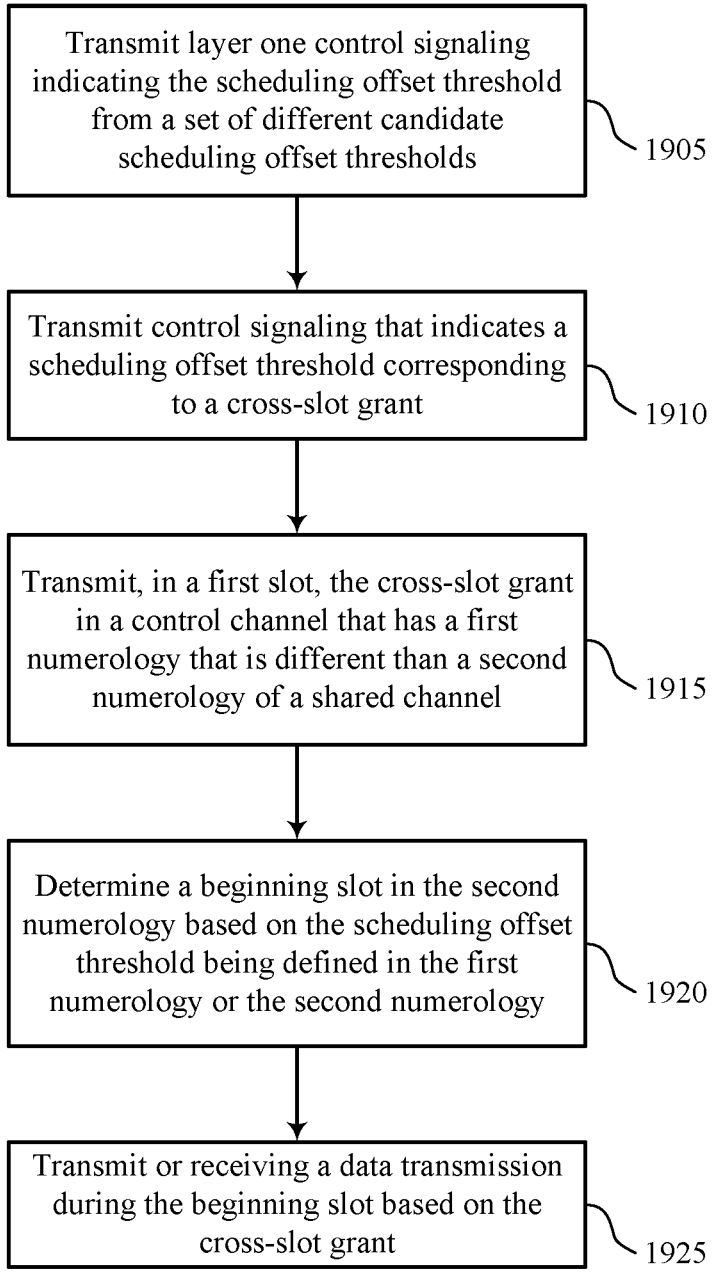

Transmit layer one control signaling
indicating the scheduling offset threshold
from a set of different candidate
scheduling offset thresholds

1905

Transmit control signaling that indicates a
scheduling offset threshold corresponding
to a cross-slot grant

1910

Transmit, in a first slot, the cross-slot grant
in a control channel that has a first
numerology that is different than a second
numerology of a shared channel

1915

Determine a beginning slot in the second
numerology based on the scheduling offset
threshold being defined in the first
numerology or the second numerology

1920

Transmit or receiving a data transmission
during the beginning slot based on the
cross-slot grant

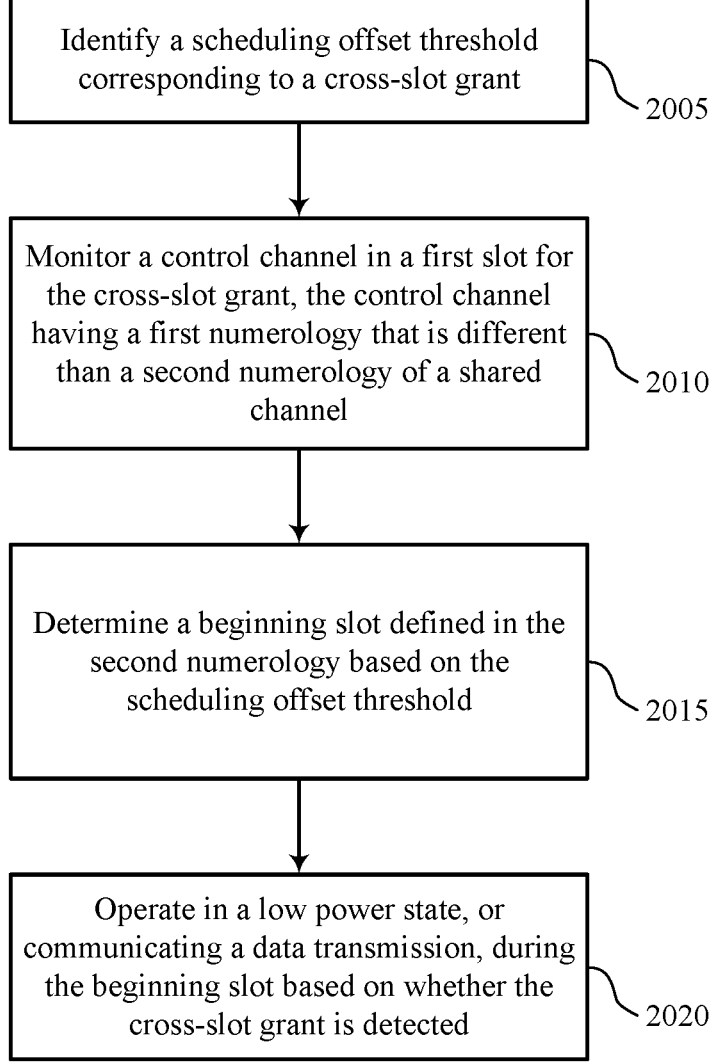

Identify a scheduling offset threshold corresponding to a cross-slot grant

~2005

Monitor a control channel in a first slot for the cross-slot grant, the control channel having a first numerology that is different than a second numerology of a shared channel

~2010

Determine a beginning slot defined in the second numerology based on the scheduling offset threshold

~2015

Operate in a low power state, or communicating a data transmission, during the beginning slot based on whether the cross-slot grant is detected

CROSS-SLOT SCHEDULING FOR CROSS NUMEROLOGY

CROSS REFERENCE

The present Application for Patent is a continuation of U.S. patent application Ser. No. 16/877,371 by ANG et al., entitled "CROSS-SLOT SCHEDULING FOR CROSS NUMEROLOGY," filed May 18, 2020, which claims the benefit of U.S. Provisional Patent Application No. 62/852,959 by ANG et al., entitled "CROSS-SLOT SCHEDULING FOR CROSS NUMEROLOGY," filed May 24, 2019, each of which is assigned to the assignee hereof, and each of which is expressly incorporated by reference herein.

BACKGROUND

The following relates generally to wireless communications, and more specifically to cross-slot scheduling for cross numerology.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may support communications with a base station using one or more numerologies. Scheduling techniques based on two or more different numerologies may have some deficiencies that can be improved.

SUMMARY

The described techniques relate to improved methods, systems, devices, and apparatuses that support cross-slot scheduling for cross numerology. Generally, the described techniques provide for a user equipment (UE) to determine whether to operate in a low power state or to communicate data on a shared channel. The UE may be configured with one or more component carriers or bandwidth parts (BWPs), or both, according to a carrier aggregation configuration. Some carriers may be configured for uplink transmissions, downlink transmissions, or both uplink and downlink. In some cases, two carriers configured for the UE may have different subcarrier spacings (SCSs). The UE may be capable of operating in a lower power mode when not scheduled for a transmission. For example, if the UE knows ahead of time the range of symbols which are not scheduled for a transmission, the UE may put some of its antenna, radio frequency (RF) hardware, or front-end hardware into a power saving mode for that range of symbols.

To support an extended duration of the UE being in the power saving mode, the UE and base station may implement techniques to enhance cross-slot scheduling by using a minimum scheduling offset. For example, a minimum downlink scheduling offset may control the minimum gap between a downlink control channel and a downlink shared channel that the UE is expected to handle for downlink shared channel scheduling. These techniques may be described with reference to cross-slot scheduling slots that may have different numerologies. These techniques may remove ambiguity in how the UE could interpret the minimum scheduling offset when the scheduling downlink control channel has a different numerology than the shared channel. Using the techniques described herein, the UE may interpret the minimum scheduling offset and determine a first slot, or a beginning slot, on a shared channel which could be scheduled by a grant transmitted on a downlink control channel. The UE may then determine to either operate in a low power state or to communicate data on the shared channel based on whether the UE received a grant scheduling the UE for a transmission.

A method of wireless communications by a UE is described. The method may include identifying a scheduling offset threshold corresponding to a cross-slot grant, monitoring a control channel in a first slot for the cross-slot grant, the control channel having a first numerology that is different than a second numerology of a shared channel, determining a beginning slot defined in the second numerology based on the scheduling offset threshold, and operating in a low power state, or communicating a data transmission, during the beginning slot based on whether the cross-slot grant is detected.

An apparatus for wireless communications by a UE is described. The apparatus may include a processor, memory coupled with the processor, and instructions stored in the memory. The instructions may be executable by the processor to cause the apparatus to identify a scheduling offset threshold corresponding to a cross-slot grant, monitor a control channel in a first slot for the cross-slot grant, the control channel having a first numerology that is different than a second numerology of a shared channel, determine a beginning slot defined in the second numerology based on the scheduling offset threshold, and operate in a low power state, or communicating a data transmission, during the beginning slot based on whether the cross-slot grant is detected.

Another apparatus for wireless communications by a UE is described. The apparatus may include means for identifying a scheduling offset threshold corresponding to a cross-slot grant, monitoring a control channel in a first slot for the cross-slot grant, the control channel having a first numerology that is different than a second numerology of a shared channel, determining a beginning slot defined in the second numerology based on the scheduling offset threshold, and operating in a low power state, or communicating a data transmission, during the beginning slot based on whether the cross-slot grant is detected.

A non-transitory computer-readable medium storing code for wireless communications by a UE is described. The code may include instructions executable by a processor to identify a scheduling offset threshold corresponding to a cross-slot grant, monitor a control channel in a first slot for the cross-slot grant, the control channel having a first numerology that is different than a second numerology of a shared channel, determine a beginning slot defined in the second numerology based on the scheduling offset threshold, and operate in a low power state, or communicating a data transmission, during the beginning slot based on whether the cross-slot grant is detected.

In some examples of the method, apparatuses, and non-transitory computer-readable medium described herein, identifying the scheduling offset threshold may include operations, features, means, or instructions for retrieving a set of different candidate scheduling offset thresholds from local storage of the UE, the set of different candidate scheduling offset thresholds being preconfigured, and receiving layer one control signaling indicating the scheduling offset threshold from the set of different candidate scheduling offset thresholds.

Some examples of the method, apparatuses, and non-transitory computer-readable medium described herein may further include operations, features, means, or instructions for interpreting the scheduling offset threshold as being defined in the first numerology or the second numerology based on a preconfiguration or received control signaling.

Some examples of the method, apparatuses, and non-transitory computer-readable medium described herein may further include operations, features, means, or instructions for receiving the cross-slot grant in a downlink bandwidth part having the first numerology, the cross-slot grant scheduling the data transmission as an uplink transmission on the shared channel in an active uplink bandwidth part having the second numerology.

Some examples of the method, apparatuses, and non-transitory computer-readable medium described herein may further include operations, features, means, or instructions for switching from a first uplink bandwidth part to the active uplink bandwidth part based on receiving the cross-slot grant.

Some examples of the method, apparatuses, and non-transitory computer-readable medium described herein may further include operations, features, means, or instructions for receiving the cross-slot grant in a downlink bandwidth part having the first numerology, the cross-slot grant scheduling the data transmission as a downlink transmission on the shared channel in a target downlink bandwidth part having the second numerology.

Some examples of the method, apparatuses, and non-transitory computer-readable medium described herein may further include operations, features, means, or instructions for switching from a first downlink bandwidth part to the target downlink bandwidth part based on receiving the cross-slot grant.

In some examples of the method, apparatuses, and non-transitory computer-readable medium described herein, determining the beginning slot may include operations, features, means, or instructions for converting the scheduling offset threshold to a second scheduling offset threshold in the second numerology, the scheduling offset threshold being defined in the first numerology, and determining the beginning slot based on the second scheduling offset threshold.

Some examples of the method, apparatuses, and non-transitory computer-readable medium described herein may further include operations, features, means, or instructions for receiving the cross-slot grant via a first component carrier that may be defined in the first numerology, the cross-slot grant scheduling the data transmission on the shared channel via a second component carrier that may be defined in the second numerology.

In some examples of the method, apparatuses, and non-transitory computer-readable medium described herein, entering the low power state or communicating the data transmission may include operations, features, means, or instructions for entering the low power state based on determining that the cross-slot grant may have not been detected.

In some examples of the method, apparatuses, and non-transitory computer-readable medium described herein, entering the low power state or communicating the data transmission may include operations, features, means, or instructions for receiving or transmitting the data transmission based on receiving the cross-slot grant.

In some examples of the method, apparatuses, and non-transitory computer-readable medium described herein, the scheduling offset threshold indicates a number of slots defined in the first numerology.

In some examples of the method, apparatuses, and non-transitory computer-readable medium described herein, the scheduling offset threshold indicates a number of slots defined in the second numerology.

In some examples of the method, apparatuses, and non-transitory computer-readable medium described herein, the scheduling offset threshold corresponds to a minimum scheduling offset or a minimum applicable value.

In some examples of the method, apparatuses, and non-transitory computer-readable medium described herein, determining the beginning slot of the shared channel may include operations, features, means, or instructions for determining the beginning slot relative to the control channel based on the scheduling offset threshold.

In some examples of the method, apparatuses, and non-transitory computer-readable medium described herein, the control channel of the first slot occurs after a beginning symbol period of the first slot, and where the scheduling offset threshold indicates a number of symbol periods defined in the second numerology relative to a beginning of the control channel.

Some examples of the method, apparatuses, and non-transitory computer-readable medium described herein may further include operations, features, means, or instructions for receiving, via a second control channel of the first slot, a second cross-slot grant.

In some examples of the method, apparatuses, and non-transitory computer-readable medium described herein, determining the beginning slot of the shared channel may include operations, features, means, or instructions for determining the beginning slot relative to the control channel based on the scheduling offset threshold and a second scheduling offset indicated in the cross-slot grant, and determining a second beginning slot relative to the second control channel based on the scheduling offset threshold and a third scheduling offset indicated in the second cross-slot grant.

In some examples of the method, apparatuses, and non-transitory computer-readable medium described herein, the scheduling offset threshold indicates a number of symbol periods defined in the second numerology.

In some examples of the method, apparatuses, and non-transitory computer-readable medium described herein, the scheduling offset threshold indicates a relative timing difference.

In some examples of the method, apparatuses, and non-transitory computer-readable medium described herein, determining the beginning slot of the shared channel may include operations, features, means, or instructions for determining the beginning slot relative to the control channel based on the relative timing difference, and determining the second beginning slot of the shared channel relative to the second control channel based on the relative timing difference.

Some examples of the method, apparatuses, and non-transitory computer-readable medium described herein may further include operations, features, means, or instructions for receiving control signaling indicating a change to the scheduling offset threshold.

Some examples of the method, apparatuses, and non-transitory computer-readable medium described herein may further include operations, features, means, or instructions for applying the change to the scheduling offset threshold in a slot occurring after the beginning slot.

In some examples of the method, apparatuses, and non-transitory computer-readable medium described herein, determining the beginning slot of the shared channel may include operations, features, means, or instructions for mapping an ending symbol period of the control channel to a shared channel slot of the shared channel defined in the second numerology, and determining the beginning slot based on the shared channel slot and the relative timing difference.

In some examples of the method, apparatuses, and non-transitory computer-readable medium described herein, the control channel of the first slot includes a beginning symbol period of the first slot, and where the scheduling offset threshold indicates a number of symbol periods defined in the second numerology relative to the control channel.

In some examples of the method, apparatuses, and non-transitory computer-readable medium described herein, entering the low power state or communicating the data transmission may include operations, features, means, or instructions for controlling at least one radio frequency chain to enter the low power state based on whether the cross-slot grant may be detected.

In some examples of the method, apparatuses, and non-transitory computer-readable medium described herein, determining the beginning slot of the shared channel may include operations, features, means, or instructions for determining the beginning slot based on the scheduling offset threshold and a second scheduling offset indicated in the cross-slot grant.

In some examples of the method, apparatuses, and non-transitory computer-readable medium described herein, monitoring the control channel in the first slot for the cross-slot grant further may include operations, features, means, or instructions for determining that the cross-slot grant may be invalid based on the second scheduling offset having a shorter duration than the scheduling offset threshold, and entering the low power state based on determining that the cross-slot grant may be invalid.

A method of wireless communications by a base station is described. The method may include transmitting control signaling that indicates a scheduling offset threshold corresponding to a cross-slot grant, transmitting, in a first slot, the cross-slot grant in a control channel that has a first numerology that is different than a second numerology of a shared channel, determining a beginning slot in the second numerology based on the scheduling offset threshold, and transmitting or receiving a data transmission during the beginning slot based on the cross-slot grant.

An apparatus for wireless communications by a base station is described. The apparatus may include a processor, memory coupled with the processor, and instructions stored in the memory. The instructions may be executable by the processor to cause the apparatus to transmit control signaling that indicates a scheduling offset threshold corresponding to a cross-slot grant, transmit, in a first slot, the cross-slot grant in a control channel that has a first numerology that is different than a second numerology of a shared channel, determine a beginning slot in the second numerology based on the scheduling offset threshold, and transmit or receiving a data transmission during the beginning slot based on the cross-slot grant.

Another apparatus for wireless communications by a base station is described. The apparatus may include means for transmitting control signaling that indicates a scheduling offset threshold corresponding to a cross-slot grant, transmitting, in a first slot, the cross-slot grant in a control channel that has a first numerology that is different than a second numerology of a shared channel, determining a beginning slot in the second numerology based on the scheduling offset threshold, and transmitting or receiving a data transmission during the beginning slot based on the cross-slot grant.

A non-transitory computer-readable medium storing code for wireless communications by a base station is described. The code may include instructions executable by a processor to transmit control signaling that indicates a scheduling offset threshold corresponding to a cross-slot grant, transmit, in a first slot, the cross-slot grant in a control channel that has a first numerology that is different than a second numerology of a shared channel, determine a beginning slot in the second numerology based on the scheduling offset threshold, and transmit or receiving a data transmission during the beginning slot based on the cross-slot grant.

In some examples of the method, apparatuses, and non-transitory computer-readable medium described herein, transmitting the control signaling may include operations, features, means, or instructions for transmitting layer one control signaling indicating the scheduling offset threshold from a set of different candidate scheduling offset thresholds.

In some examples of the method, apparatuses, and non-transitory computer-readable medium described herein, transmitting the cross-slot grant may include operations, features, means, or instructions for transmitting the cross-slot grant in a downlink bandwidth part having the first numerology, the cross-slot grant scheduling the data transmission as an uplink transmission on the shared channel in an active uplink bandwidth part having the second numerology.

In some examples of the method, apparatuses, and non-transitory computer-readable medium described herein, transmitting the cross-slot grant may include operations, features, means, or instructions for transmitting the cross-slot grant in a downlink bandwidth part having the first numerology, the cross-slot grant scheduling the data transmission as a downlink transmission on the shared channel in a target uplink bandwidth part having the second numerology.

In some examples of the method, apparatuses, and non-transitory computer-readable medium described herein, determining the beginning slot may include operations, features, means, or instructions for converting the scheduling offset threshold to a second scheduling offset threshold in the second numerology, the scheduling offset threshold being defined in the first numerology, and determining the beginning slot based on the second scheduling offset threshold.

In some examples of the method, apparatuses, and non-transitory computer-readable medium described herein, transmitting the cross-slot grant may include operations, features, means, or instructions for transmitting the cross-slot grant via a first component carrier that may be defined in the first numerology, the cross-slot grant scheduling the data transmission on the shared channel via a second component carrier that may be defined in the second numerology.

In some examples of the method, apparatuses, and non-transitory computer-readable medium described herein, the scheduling offset threshold indicates a number of slots defined in the first numerology.

In some examples of the method, apparatuses, and non-transitory computer-readable medium described herein, the scheduling offset threshold indicates a number of slots defined in the second numerology.

In some examples of the method, apparatuses, and non-transitory computer-readable medium described herein, the scheduling offset threshold may be a minimum scheduling offset threshold.

In some examples of the method, apparatuses, and non-transitory computer-readable medium described herein, determining the beginning slot of the shared channel may include operations, features, means, or instructions for determining the beginning slot relative to the control channel based on the scheduling offset threshold.

In some examples of the method, apparatuses, and non-transitory computer-readable medium described herein, the control channel of the first slot occurs after a beginning symbol period of the first slot, and where the scheduling offset threshold indicates a number of symbol periods in the second numerology relative to a beginning of the control channel.

Some examples of the method, apparatuses, and non-transitory computer-readable medium described herein may further include operations, features, means, or instructions for transmitting, via a second control channel of the first slot, a second cross-slot grant.

In some examples of the method, apparatuses, and non-transitory computer-readable medium described herein, determining the beginning slot of the shared channel may include operations, features, means, or instructions for determining the beginning slot relative to the control channel based on the scheduling offset threshold and a second scheduling offset indicated in the cross-slot grant, and determining a second beginning slot relative to the second control channel based on the scheduling offset threshold and a third scheduling offset indicated in the second cross-slot grant.

In some examples of the method, apparatuses, and non-transitory computer-readable medium described herein, the scheduling offset threshold indicates a number of symbol periods defined in the second numerology.

In some examples of the method, apparatuses, and non-transitory computer-readable medium described herein, the scheduling offset threshold may be a relative timing difference.

In some examples of the method, apparatuses, and non-transitory computer-readable medium described herein, determining the beginning slot of the shared channel may include operations, features, means, or instructions for determining the beginning slot relative to the control channel based on the relative timing difference, and determining the second beginning slot of the shared channel relative to the second control channel based on the relative timing difference.

Some examples of the method, apparatuses, and non-transitory computer-readable medium described herein may further include operations, features, means, or instructions for transmitting control signaling indicating a change to the scheduling offset threshold.

Some examples of the method, apparatuses, and non-transitory computer-readable medium described herein may further include operations, features, means, or instructions for applying the change to the scheduling offset threshold in a slot occurring after the beginning slot.

In some examples of the method, apparatuses, and non-transitory computer-readable medium described herein, determining the beginning slot of the shared channel may include operations, features, means, or instructions for mapping an ending symbol period of the control channel to a shared channel slot of the shared channel defined in the second numerology, and determining the beginning slot based on the shared channel slot and the relative timing difference.

In some examples of the method, apparatuses, and non-transitory computer-readable medium described herein, the control channel of the first slot includes a beginning symbol period of the first slot, and where the scheduling offset threshold indicates a number of symbol periods defined in the second numerology relative to the control channel.

BRIEF DESCRIPTION OF THE DRAWINGS

FIGS. 15 through 20 show flowcharts illustrating methods that support cross-slot scheduling for cross numerology in accordance with aspects of the present disclosure.

DETAILED DESCRIPTION

Figure 1:
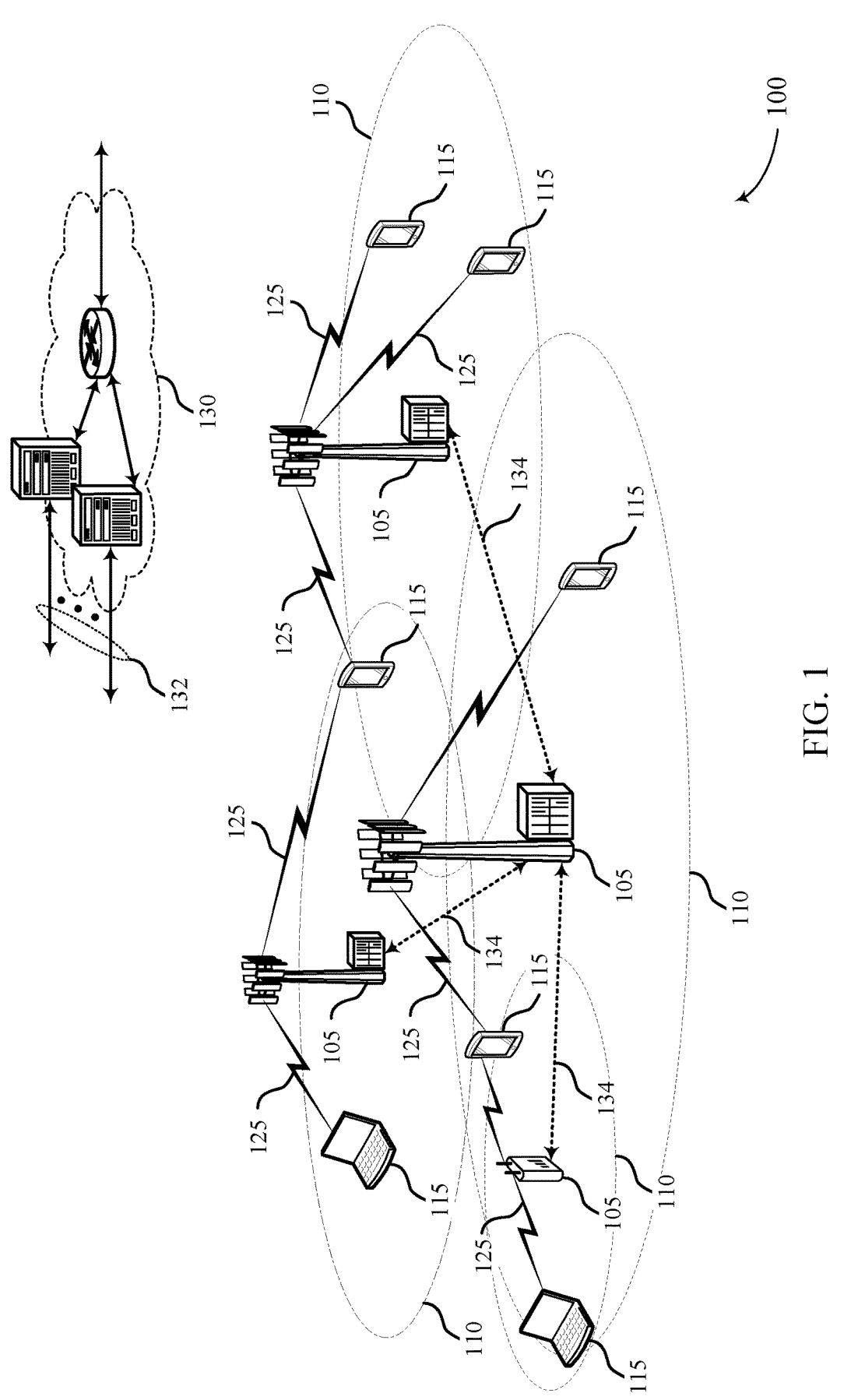
FIG. 1 illustrates an example of a system for wireless communications that supports cross-slot scheduling for cross numerology in accordance with aspects of the present disclosure.

A user equipment (UE) may communicate with a base station on one or more component carriers according to a carrier aggregation configuration. Some carriers may be configured for uplink transmissions, downlink transmissions, or both uplink and downlink. In some cases, two carriers configured for the UE may have different subcarrier spacings (SCSs). In some examples, slot duration may be based on SCS, so a slot on a first carrier may have a different length than a slot on a second carrier if the first and second carriers have different numerologies. In some cases, the base station may transmit downlink control information (DCI) on a downlink carrier, the DCI carrying a grant which may schedule the UE for an uplink or downlink shared channel transmission. In some cases, the base station may indicate a scheduling gap between a grant on a downlink control channel and the shared channel which is scheduled by the grant. In some examples, the scheduling gap may be 0, indicating that the shared channel is scheduled for the same slot as the grant. In some other examples, the scheduling gap may be greater than 0 slots, indicating that the scheduled shared channel is in a subsequent slot (e.g., a value of 0 may indicate same slot, a value of 1 may indicate the next slot, a value of 2 may indicate the slot after next, etc.).

The UE may be capable of operating in a lower power mode when not scheduled for a transmission. For example, if the UE knows ahead of time the range of symbols which are not scheduled for a transmission, the UE may put some of its antenna, radio frequency (RF) hardware, or front-end hardware into a power saving mode for that range of symbols. It may take some time for the UE to process a downlink control channel to determine whether or not the downlink control channel has an assignment for the UE. With cross-slot scheduling (e.g., a scheduling gap larger than 0 slots), the UE may determine if a current slot is scheduled based on downlink control information received in a previous slot, which may enable the UE to extend the duration of being in the low power state. However, some advantages of cross-slot scheduling may not be realized as long as the UE supports same-slot scheduling. In some cases, it may not be sufficient for the network to cross-slot scheduling as well as same-slot scheduling, as the UE may first have to finish blind decoding all of the downlink control channel candidates to know whether or not there are any same-slot assignments.

Therefore, the UE and base station may implement for cross-slot scheduling by using a minimum scheduling offset. For example, a minimum downlink scheduling offset may explicitly control the minimum gap between a downlink control channel and a downlink shared channel that the UE is expected to handle for downlink shared channel scheduling. These techniques are described with reference to cross-slot scheduling slots that may have different numerologies. In some cases, cross-slot scheduling with different numerologies may introduce some ambiguity in how the UE could interpret the minimum scheduling offset. For example, the UE may not know whether to interpret the minimum scheduling offset based on the numerology of the scheduling channel or based on the numerology of the scheduled channel if the two numerologies are different. Using the techniques described herein, the UE may interpret the minimum scheduling offset and determine a first slot, or a beginning slot, on a shared channel which could be scheduled by a grant transmitted on a downlink control channel. The UE may then determine to either operate in a low power state starting at that slot or to communicate data on the shared channel based on whether the UE received a grant scheduling the UE for a transmission. Various different scenarios are described herein, including cross-bandwidth part (BWP) scheduling, cross-component carrier scheduling, and BWP reselection, among others. Further, multiple different possible interpretations of the minimum scheduling offset are described herein, including interpretations based on the numerology of the scheduling control channel, the scheduled shared channel, or a combination thereof.

Aspects of the disclosure are initially described in the context of a wireless communications system. Aspects of the disclosure are further illustrated by and described with reference to apparatus diagrams, system diagrams, and flowcharts that relate to cross-slot scheduling for cross numerology.

FIG. 1 illustrates an example of a wireless communications system 100 that supports cross-slot scheduling for cross numerology in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105.

Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

To support an extended duration of UEs 115 being in a power saving mode or microsleep, UEs 115 and base stations 105 described herein may implement techniques to enhance cross-slot scheduling by using a minimum scheduling offset. For example, a minimum downlink scheduling offset may control the minimum gap between a downlink control channel and a downlink shared channel that a UE 115 is expected to handle for downlink shared channel scheduling. These techniques may be described with reference to cross-slot scheduling slots that may have different numerologies. These techniques may remove ambiguity in how the UE 115 could interpret the minimum scheduling offset when the scheduling downlink control channel has a different numerology than the shared channel. Using the techniques described herein, the UE 115 may interpret the minimum scheduling offset and determine a first slot, or a beginning slot, on a shared channel which could be scheduled by a grant transmitted on a downlink control channel. The UE 115 may then determine to either operate in a low power state starting at that slot or to communicate data on the shared channel during that slot based on whether the UE 115 received a grant scheduling the UE 115 for a transmission.

Figure 2:
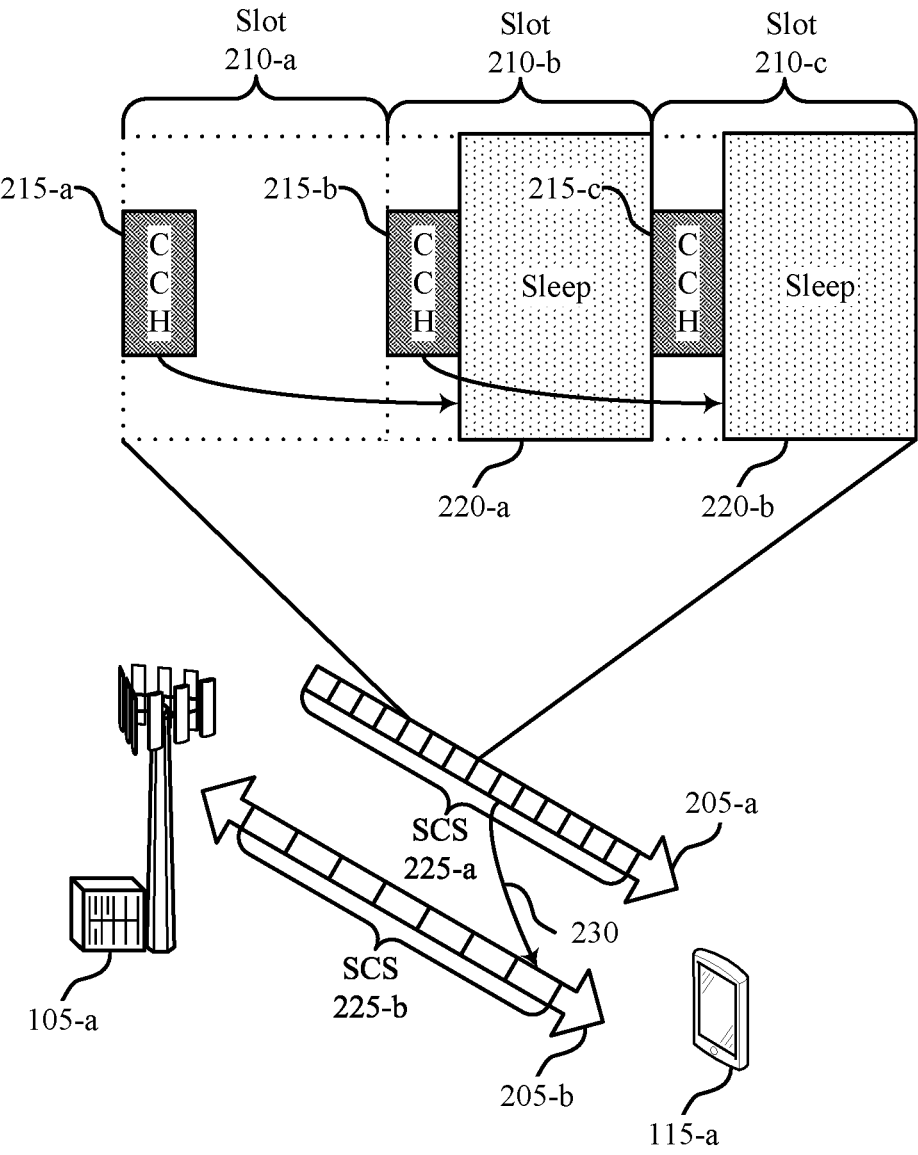
FIG. 2 illustrates an example of a wireless communications system that supports cross-slot scheduling for cross numerology in accordance with aspects of the present disclosure.

FIG. 2 illustrates an example of a wireless communications system 200 that supports cross-slot scheduling for cross numerology in accordance with aspects of the present disclosure. In some examples, wireless communications system 200 may implement aspects of wireless communication system 100. The wireless communications system 200 may include UE 115-a and base station 105-a, which may be respective examples of a UE 115 and a base station 105 described herein.

UE 115-a may communicate with base station 105-a on one or more component carriers according to a carrier aggregation configuration. For example, UE 115-a may receive downlink transmissions on a first carrier 205-a. UE 115-a may also have a second carrier 205-b configured, which may be an example of an uplink carrier (e.g., where UE 115-a transmits to base station 105-a on the second carrier 205-b) or a downlink carrier (e.g., where base station 105-a transmits to UE 115-a on the second carrier 205-b). In some cases, two carriers 205 configured for UE 115-a may have different subcarrier spacings (SCSs) 225. For example, the first carrier 205-a may have a first SCS 225-a, and the second carrier 205-b may have a second SCS 225-b. In some cases, a slot 210 configured based on the first SCS 225-a may have a different duration than a slot configured based on the second SCS 225-b. For example, the first SCS 225-a may be 15 KHz, and the second SCS 225-b may be 30 KHz.

Therefore, a slot configured based on the first SCS 225-a may be twice as long (e.g., have twice as long of a duration) as a slot configured based on the second SCS 225-b.

Base station 105-a may transmit a grant in downlink control information (DCI) on a downlink control channel 215 (e.g., a control channel (CCH) such as a physical downlink control channel (PDCCH)). The grant may schedule resources for UE 115-a, so that UE 115-a can transmit data to base station 105-a, or receive data from base station 105-a, on the scheduled resources. UE 115-a may transmit data to base station 105-a on an uplink shared channel, such as a physical uplink shared channel (PUSCH), and base station 105-a may transmit data to UE 115-a on a downlink shared channel, such as a physical downlink shared channel (PDSCH).

In some cases, scheduling techniques of the wireless communications system 200 may support a scheduling gap between a scheduling downlink control channel 215 and a scheduled shared channel. A scheduling gap may be indicated as a number of slots between the downlink control channel 215 and the scheduled resource. For example, a scheduling gap of '0' may indicate that a grant is scheduling resources within the same slot, where a scheduling gap of '1' may indicate that a grant is scheduling resources in a following slot. A scheduling gap between PDCCH and PDSCH may be referred to as K0, and a scheduling gap between PDCCH and PUSCH may be referred to as K2. Therefore, cross-slot scheduling may correspond to a scheduling gap value which is non-zero or greater than zero. Same-slot scheduling may refer to DCI scheduling resources with a scheduling gap of zero.

In some examples, a scheduling gap may be indicated in DCI transmitted on the control channel 215. The scheduling gap may correspond to a slot offset between the scheduling PDCCH and the scheduled shared channel (e.g., PDSCH or PUSCH). An index to an entry in a time domain resource allocation (TDRA) table (e.g., "pdsch-TimeDomainAllocationList" or "pusch-TimeDomainAllocationList") may be indicated by the DCI. The entry in the TDRA table may contain the actual K0, or K2, value. The TDRA tables may include one or more possible scheduling gap values for each of K0 and K2. In some cases, each of the possible K0 or K2 candidates may be the K0 or K2 values stored in the TDRA tables. In some cases, the TDRA tables may be semi-statically configured, such as by RRC.

UE 115-a may be capable of operating in a lower power mode when UE 115-a is not scheduled to monitor any resources. For example, if UE 115-a knows ahead of time (e.g., a-priori) the range of symbols which are not carrying a transmission for UE 115-a, then UE 115-a may put its RF and portion of front-end hardware, and in some cases additional hardware, into a power saving mode for that range of symbols. In some cases, a UE 115 going into a low power mode as described for a short period of time (e.g., a few symbol periods or a few slots) when the UE 115 is not scheduled may be referred to as microsleep. Microsleep may include turning off the RF and related circuitry, but some baseband processing may still be performed on captured samples.

There may, in some cases, be some processing time associated with UE 115-a determining whether or not a set of resources are scheduled. For example, for slot scheduling with a scheduling gap of 0 (e.g., K0=0), UE 115-a may process the PDCCH of a slot, determine that there is not a grant or scheduled resources within that slot, and then enter the low powered mode once the PDCCH is processed for the remainder of the first slot if there is not an assignment for UE 115-a within that slot. However, in some same-slot scheduling techniques, there may be a period after the last symbol of the PDCCH during which UE 115-a is not scheduled but also not in the low power mode, as UE 115-a is still processing the PDCCH and receiving the samples and store them in case a DL scheduling grant is decoded for the current slot and the PDSCH needs to be processed.

With cross-slot scheduling, UE 115-a may determine if a current slot is scheduled based on downlink control information received in a previous slot. For example, UE 115-a may determine whether slot 210-b is scheduled based on DCI received in control channel 215-a during slot 210-a. If UE 115-a is not scheduled for one or more symbols of slot 210-b, UE 115-a may go to sleep or operate in a low power mode during those symbols.

Cross-slot scheduling may enable UE 115-a to extend the duration of microsleep or the duration of being in the low power state, as the PDCCH processing may finish before UE 115-a is able to know no other transmissions will be missed and UE 115-a can enter the low power mode. Compared to techniques of same-slot scheduling (e.g., K0=0), where processing the PDCCH can delay UE 115-a from entering the low power mode, UE 115-a may perform and complete PDCCH processing in a previous slot. Thus, with cross-slot scheduling, UE 115-a may be able to enter the low power mode right away after the last symbol of control channel 215-b in slot 210-b based on scheduling information (e.g., a grant) received in control channel 215-a.

In some cases, UE 115-a may buffer and process received samples for PDCCH symbols while in the low power mode. For example, UE 115-a may receive DCI on control channel 215-b and operate in or enter a low power or sleep state after the last symbol period of control channel 215-b based on scheduling information received in control channel 215-a. While in the low power mode, UE 115-a may process control channel 215-b and determine that there are no scheduled transmissions for UE 115-a in slot 210-c after control channel 215-c. Therefore, after UE 115-a monitors control channel 215-c, UE 115-a may immediately enter low power mode for the remainder of slot 210-c.

In some cases, some advantages of cross-slot scheduling may be actualized if the network does not support same-slot scheduling. For example, it may not be sufficient for the network to be able to schedule with a scheduling gap greater than 0 by DCI indication. In the example of downlink scheduling, if a K0 of 0 is among the semi-statically configured K0 candidates in the downlink TDRA table, then UE 115-a may still not be able to support extended microsleep, as UE 115-a may first have to finish blind decoding all of the PDCCH candidates to know whether or not there are any same-slot (e.g., K0=0 or K2=0) assignments conveyed by DCI in one of the PDCCH candidates. Unless UE 115-a checks each possible PDCCH candidate, UE 115-a may not be certain that there are no scheduled transmissions for UE 115-a in that slot.

Therefore, some wireless communications systems, such as wireless communication system 200, may implement configurations where a scheduling gap is configured to be greater than 0. In some cases, the scheduling gap for UE 115-a may be guaranteed to be at least greater than a threshold (e.g., greater than 0 slots to ensure cross-slot scheduling). In some cases, each entry in the TDRAs for uplink data and downlink data may be greater than 0 slots, such that each candidate scheduling gap (e.g., each candidate K0 and K2) is greater than 0 slots. This may relax the grant processing timeline to enable UE 115-a to extend the microsleep duration, which may lead to power savings at UE 115-*a*. Therefore, by ensuring that cross-slot scheduling is used, and that same-slot scheduling is not configured, the wireless communications system 200 may implement techniques for enhanced extended microsleep. A minimum of K0>0 configuration (e.g., only supporting cross-slot scheduling) may be beneficial for UE power saving but may come at a slight expense of latency. In some cases, it may be supported to switch to same-slot scheduling (e.g., a mode where k0 can be equal to 0) during a traffic burst.

In some cases, the configuration for cross-slot schedule using the minimum scheduling offset may be triggered or activated by base station 105-*a*. For example, the TDRA tables may be configured by base station 105-*a* via RRC. In some cases, base station 105-*a* may transmit signaling (e.g., a media access control (MAC) control element (CE)) to indicate that only cross-slot scheduling is supported and that only scheduling gaps which are greater than 0 are candidate scheduling gaps. In some cases, base station 105-*a* may indicate updates for one or more TDRA tables. In some examples, UE 115-*a* may be configured with multiple TDRA tables, and the signaling may indicate which of the TDRA tables UE 115-*a* is to use. Or, in some cases, the signaling may indicate to UE 115-*a* to ignore some entries of the TDRA tables (e.g., candidate values where a scheduling gap is equal to 0). Similarly, base station 105-*a* may transmit signaling to indicate that same-slot scheduling is supported (e.g., in addition, or as an alternative, to cross-slot scheduling).

In some cases, these techniques may be applied to other signaling which is dynamically triggered by DCI. For example, when A-CSI is triggered, the time offset from the grant to the A-CSI-RS may similarly be configured (e.g., guaranteed) to be span one or more slots to extend UE microsleep, similar to cross-slot scheduling for PDSCH and PUSCH. For example, A-CSI reporting may be supported to implement similar techniques to those described for PDSCH and PUSCH transmissions where K0 and K2 are larger than 0.

In some examples, the wireless communications system 200 may support a minimum scheduling offset configuration. For example, a minimum downlink scheduling offset may explicitly control the minimum K0 that UE 115-*a* is expected to handle for PDSCH scheduling, even for cross-BWP scheduling (e.g., where a resource on a target BWP is scheduled, and UE 115-*a* switches the active BWP to the target BWP). The minimum scheduling offset may ensure that any K0 or K2 value indicated to UE 115-*a* is at least the size of the minimum scheduling offset. In some cases, the minimum downlink scheduling offset may define a minimum timing offset for aperiodic CSI-RS triggering. Generally, the minimum downlink scheduling offset may also define a minimum timing offset for all other downlink channels and signals that may be scheduled or triggered by DCI. Similarly, a minimum uplink scheduling offset may be explicitly configured, serving uplink scheduling usage (e.g., K2 and A-SRS).

The minimum scheduling offset may be identified or known by UE 115-*a*. The UE 115-*a* may be signaled or configured with a scheduling offset threshold that indicates a number of slots in the minimum scheduling offset. For example, the minimum scheduling offset may be preconfigured and stored in memory at UE 115-*a*. Additionally, or alternatively, the minimum scheduling offset may be indicated over layer one (L1) signaling, such as DCI, from base station 105-*a* to UE 115-*a*. In some cases, the minimum scheduling offset may be configured via RRC, or the minimum scheduling offset may be configured for the network of the wireless communications system 200. In some examples, the minimum scheduling offset may be based on a capability of UE 115-*a*. UE 115-*a* may report its capability to base station 105-*a*, and base station 105-*a* may indicate the minimum scheduling offset based on the UE capability.

Cross-slot scheduling with slots that have the same numerology may not result in any ambiguity in slot definition for the minimum scheduling offset. For example, first slot 210-*a* may be configured based on a first numerology (e.g., corresponding to first SCS 225-*a*), and second slot 210-*b* may also be configured based on that first numerology and first SCS 225-*a*. If base station 105-*a* indicates in DCI that the minimum scheduling offset is one slot, then UE 115-*a* can determine that the earliest possible scheduled slot (e.g. a beginning slot) is the following slot after the scheduling grant. In some cases, base station 105-*a* may actually schedule resources in later slots (e.g., where the scheduling offset is indicated to be 2 slots, 3 slots, etc.), but UE 115-*a* can determine that the minimum scheduling offset is at least one slot. In this example, the definition of a slot may be the same for PDCCH and PDSCH on the first carrier 205-*a*. Similarly, if the PDCCH schedules PUSCH resources which have the same slot definition, there may be no ambiguity in how UE 115-*a* would interpret the minimum scheduling offset. Even for cross-carrier scheduling with the same numerology (e.g., DCI on carrier 205-*a* scheduling a transmission on another carrier 205 with the same numerology), the slot definition may be the same for both the scheduling component carrier and the scheduled component carrier. Therefore, if the minimum scheduling offset is indicated to be one slot, this corresponds to the same duration on the scheduling carrier as well as the scheduled carrier.

However, cross-slot scheduling across slots with different numerologies may introduce some ambiguity in how UE 115-*a* could interpret the minimum scheduling offset. For example, UE 115-*a* may not know whether to interpret the minimum scheduling offset based on the numerology of the scheduling channel or based on the numerology of the scheduled channel if the two numerologies are different. Based on the numerologies being different, this may correspond to different durations of time, so UE 115-*a* may have more than one interpretation for the minimum scheduling offset. In some examples, the active uplink BWP may have a different numerology than the active downlink BWP, and base station 105-*a* may schedule an uplink transmission that has a different numerology than the PDCCH (e.g., with or without uplink BWP switching). In another example, the scheduling PDCCH and a scheduled PDSCH on a target BWP may have different numerologies (e.g., in which case downlink BWP switching may be triggered). In another example, base station 105-*a* may schedule UE 115-*a* across component carriers with different numerologies. For example, a control channel 215 on first carrier 205-*a* may schedule UE 115-*a* for a transmission on carrier 205-*b*, when carrier 205-*a* and carrier 205-*b* have different numerologies (e.g., different SCSs 225).

The wireless communications system 200 may implement techniques and configurations to remove ambiguity for UEs 115 to interpret the minimum scheduling offset for cross-slot scheduling with different numerologies. In some cases, UE 115-*a* may interpret the minimum scheduling offset based on signaling (e.g., an indication) received from base station 105-*a*. The signaling may semi-static signaling, such as over RRC, or base station 105-*a* may include the interpretation indication in DCI. Or, in some examples, UE 115-*a* may be preconfigured with the interpretation, and this configuration may be stored in memory at UE 115-*a*. In one such example, the preconfigured interpretation can be pursuant to a definition of the minimum scheduling offset provided for in a standards document, for example, as described in a technical standard from the organization named "3rd Generation Partnership Project" (3GPP).

In a first example, UE 115-a may be scheduled for an uplink transmission, or a cross-BWP transmission, with a different numerology than the numerology of the scheduling downlink channel. As described above, cross-slot scheduling may provide power saving by improving PDCCH processing. Cross-slot scheduling may relax the PDCCH processing timeline and enhance (e.g., maximize) the duration of microsleep from the end of the last PDCCH symbol to the start of the next PDCCH occasion. In this example, the minimum scheduling offset may be defined in terms of the PDCCH slot configuration. When applying the minimum scheduling offset to scheduling PDSCH or PUSCH with a different numerology, the offset may be converted based on the numerology of the scheduled channel.

For example, X may be the minimum scheduling offset, and PDCCH may be received in slot n. The subcarrier spacing (SCS) of the PDCCH may be $2\mu PDCCH$, and the SCS of the PDSCH may be $2\mu PDSCH$. UE 115-a may not expect to be indicated for downlink with a K0 less than a slot determined by Equation (1) below or a K2 less than a slot for uplink determined by Equation (2) below.

$$\left\lceil (n+X) * \frac{2^{\mu PDSCH}}{2^{\mu PDCCH}} \right\rceil \quad (1)$$

$$\left\lceil (n+X) * \frac{2^{\mu PUSCH}}{2^{\mu PDCCH}} \right\rceil \quad (2)$$

In an example, the SCS of a scheduling PDCCH may be 15 KHz and may be received in slot 0. The SCS of the scheduled channel may be 120 KHz. UE 115-a may determine that the minimum scheduling offset is defined as X=1, UE 115-a may apply Equation (1), such that UE 115-a determines the earliest possible scheduled slot on the scheduled channel is slot 8, where $$8 = \left\lceil (0+1) * \frac{120}{15} \right\rceil.$$

In some cases, base station 105-a may schedule UE 115-a resources in a slot which is within or later than slot 8, which may correspond to the scheduling offset K0.

Therefore, UE 115-a may determine a minimum scheduling offset for a transmission on a schedulable shared channel based on the numerology of the shared channel and the numerology of the scheduling control channel using one of the equations above (e.g., Equation (1) or Equation (2)). Using the minimum scheduling offset, UE 115-a may determine the earliest possible slot for the beginning of a transmission on the shared channel. UE 115-a may monitor for downlink control information on the scheduling control channel and determine whether a cross-slot grant on the control channel was received. If UE 115-a does not receive a cross-slot grant, UE 115-a may operate in a low power state starting at the earliest possible slot for the beginning of the transmission based on the minimum scheduling offset and the lack of the grant. If UE 115-a does receive a cross-slot grant, UE 115-a may communicate with base station 105-a based on the resources indicated in the cross-slot grant.

In some examples, UE 115-a may detect an error case. For example, if UE 115-a is indicated a scheduling gap (e.g., a K0 or K2 value) which is fewer slots than the identified minimum scheduling gap (e.g., is less than the configured or indicated scheduling gap threshold), UE 115-a may determine that a scheduling error has occurred. UE 115-a may transmit an indication of the error to base station 105-a. In some examples, RF circuitry for the first carrier 205-a may be linked or tied to RF circuitry for the second carrier 205-b. In these examples, UE 115-a may only turn off the RF circuitry for both carriers 205 for one or more symbol periods if UE 115-a is not scheduled on either carrier for those one or more symbol periods.

Techniques for determining a minimum scheduling offset in other scenarios are described herein as well. For example, UE 115-a may determine a minimum scheduling offset for cross-component carrier scheduling on component carriers with different numerologies. These examples may be described in more detail with reference to at least FIGS. 3 and 4.

Figure 3:
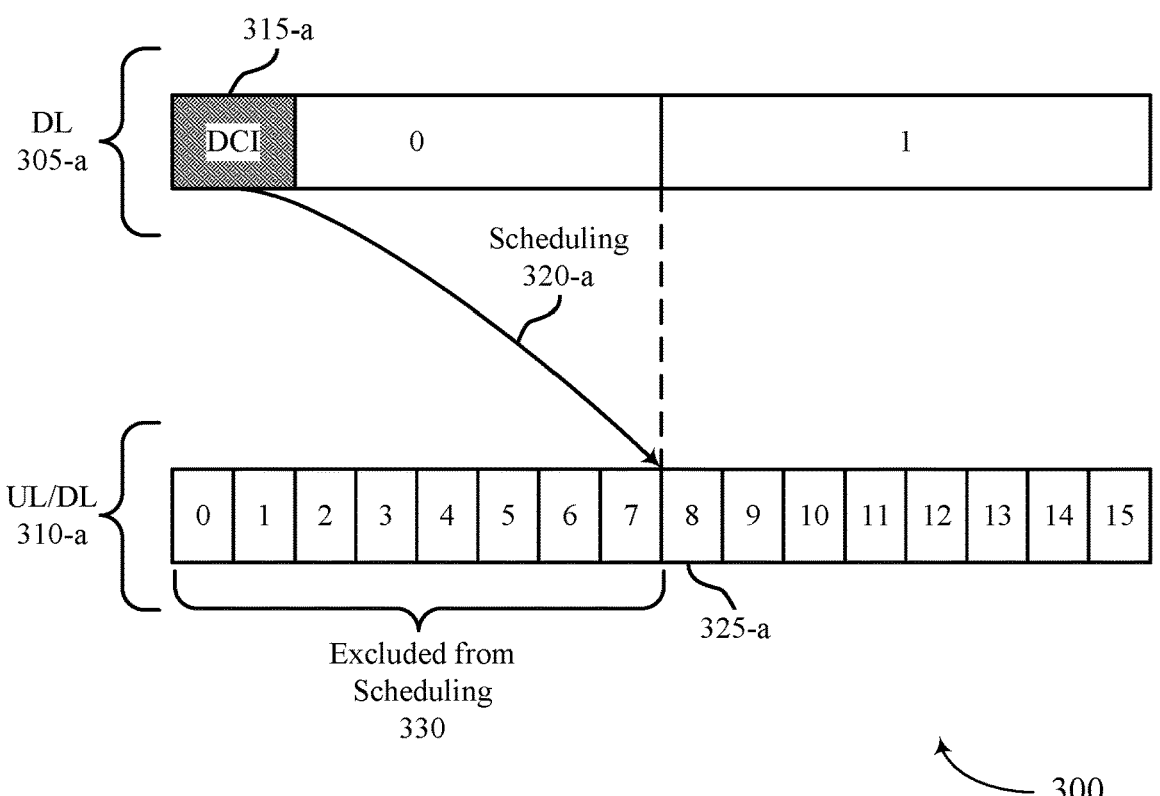
FIGS. 3 through 5 illustrate example of cross-slot scheduling configurations that support cross-slot scheduling for cross numerology in accordance with aspects of the present disclosure.
Figure 3:
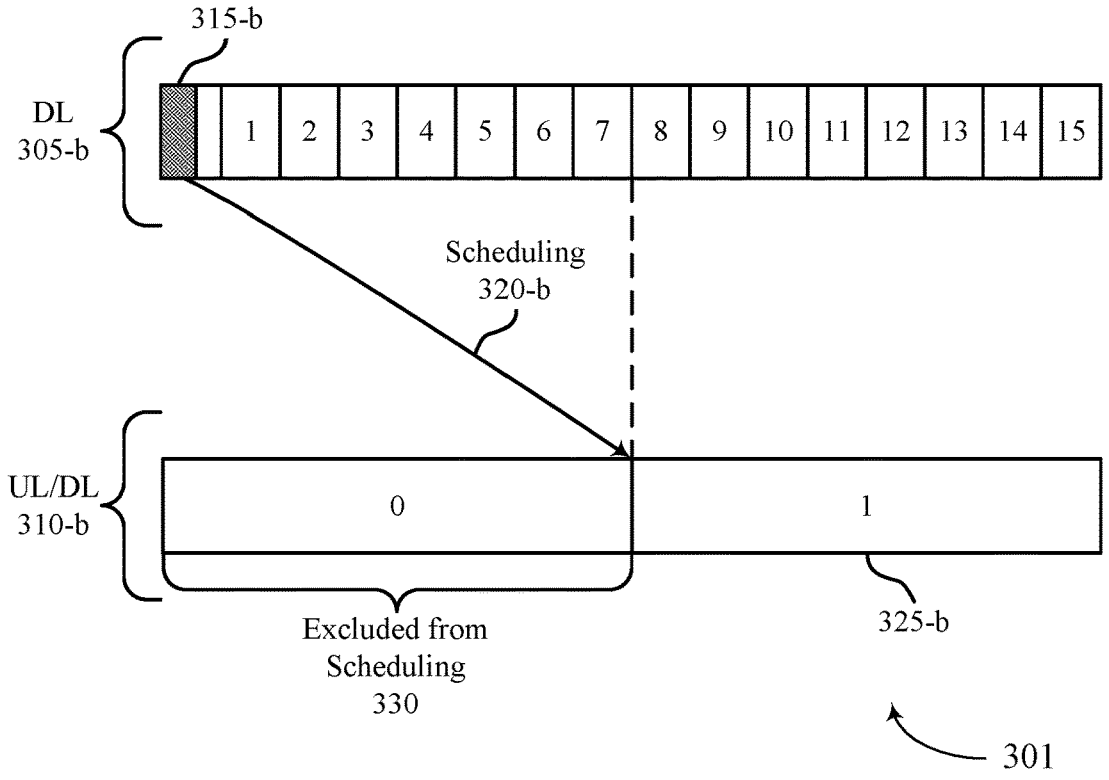

FIG. 3 illustrate examples of cross-slot scheduling configurations 300 and 301 that supports cross-slot scheduling for cross numerology in accordance with aspects of the present disclosure. In some examples, cross-slot scheduling configurations 300 and 301 may implement aspects of wireless communication system 100.

Cross-slot scheduling configurations 300 and 301 may each show an example of cross-slot scheduling where the scheduling carrier has a different numerology than the scheduled carrier. For example, a base station 105 may transmit a grant on PDCCH of a downlink carrier 305 to schedule a schedulable carrier 310 for a shared channel transmission, where the schedulable carrier 310 has a different numerology (e.g., different SCS, different slot configuration, slot length, etc.) than the downlink carrier 305. Generally, a base station 105 may transmit DCI 315 on a downlink control channel, such as PDCCH. The DCI 315 may include a grant which schedules resources on the schedulable carrier 310 (e.g., shown by a scheduling 320). In some cases, the grant, if included, may schedule resources in at least a subsequent slot (e.g., with a scheduling gap, K0 or K2, which is greater than zero), and not in the same slot.

The cross-slot scheduling configurations 300 and 301 may implement techniques to support a minimum scheduling offset. The minimum scheduling offset may enable UEs 115 implementing the cross-slot scheduling configurations 300 and 301 to enter an extended microsleep as described in FIG. 2. By determining scheduling information in advance (e.g., cross-slot) and implementing the minimum scheduling offset, a UE 115 may operate in a low power state (e.g., by turning off some RF circuitry or some front-end hardware) for symbol periods where the UE 115 is not scheduled for a transmission. In some cases, the minimum scheduling offset may prevent any chances that UE 115 goes to sleep when it may still be scheduled for a transmission. The UE 115 may determine an earliest possible schedulable slot 325 (e.g., a beginning slot) that may be scheduled by the grant in the DCI 315. Before the earliest possible schedulable slot 325 may be a set of slots 330 which cannot be scheduled by a grant in the DCI 315, per the minimum scheduling offset. The set of slots 330 may, however, be scheduled by a previously received DCI (e.g., in a previous slot not shown). UE 115 may be able to operate in the low power state for some duration of the slots 300 if the durations are not scheduled by any previously received DCI. Therefore, UE 115 may be able to enter the low power state after DCI 315 and prior to the beginning slot 325.

Cross-slot scheduling configuration 300 may show an example where the downlink carrier 305 has a lower SCS than the schedulable carrier 310. For example, downlink carrier 305-a may have an SCS of 15 KHz, and schedulable carrier 310-a may have an SCS of 120 KHz. Cross-slot configuration 301 may show an example where the downlink carrier 305 has a larger SCS than the schedulable carrier 310. For example, downlink carrier 305-b may have an SCS of 120 KHz, and schedulable carrier 310-b may have an SCS of 15 KHz.

In a first example of cross-component carrier scheduling with different numerology, the minimum scheduling offset may be defined according to numerology of the scheduling PDCCH (e.g., of the scheduling component carrier). For example, the minimum scheduling offset may be defined based on the numerology of the downlink carrier 305. In some cases, defining the minimum scheduling offset based on the scheduling PDCCH numerology may reduce complexity. This may lead to additional power savings related to PDCCH. In some cases, the minimum scheduling offset may be similarly defined for some cross-BWP cases, which may also reduce complexity.

In some cases, the first example may be scalable. For example, the first example may be beneficial when the downlink carrier 305 schedules multiple component carriers, where each of the multiple scheduled component carriers may have a different numerology than the downlink carrier 305. For example, the downlink carrier 305 may schedule multiple, other carriers (e.g., one scheduling many), including at least the schedulable carrier 310. By basing the minimum scheduling offset configuration based on the numerology of the downlink carrier 305, the UE 115 may be configured for new component carriers or drop component carriers without having to adjust or reconfigure the definition of the minimum scheduling offset.

In an example applying the first example to the cross-slot scheduling configuration 300, the minimum scheduling offset, X, may be set to 1. DCI 315-a, transmitted in slot 0 of downlink carrier 305-a, may, at the earliest, schedule slot 325-a in the eighth slot of schedulable carrier 310-a. For example, by applying Equation (1) for downlink, or Equation (2) for uplink, to the described scenario, the earliest possible schedulable slot 325-a may be slot 8, where $\lceil (0+1)*8 \rceil = 8$. UE 115-a may apply this equation to identify the minimum scheduling offset (when indicated) and use the minimum scheduling offset when determining to operate in a low power mode.

In an example applying the first example to the cross-slot scheduling configuration 301, the minimum scheduling offset, X, may be set to 4. DCI 315-b, transmitted in slot 0 of downlink carrier 305-b, may, at the earliest, schedule slot 325-b in the second slot of schedulable carrier 310-b. For example, by applying Equation (1) for downlink, or Equation (2) for uplink, to the described scenario, the earliest possible schedulable slot 325-b may be slot 1, where $\lceil (0+4)*\frac{1}{8} \rceil = 1$. UE 115-a may apply this equation to interpret the minimum scheduling offset in terms of the scheduling PDCCH and use this interpretation of the minimum scheduling offset when determining to operate in a low power mode.

In a second example of cross-component carrier scheduling with different numerologies, the minimum scheduling offset may be defined according to the numerology of the scheduled component carrier. The minimum scheduling offset may be defined in the scheduled PDSCH or PUSCH numerology. For example, the UE 115 may interpret the minimum scheduling offset based on the numerology of the schedulable carrier 310. In some cases, defining the minimum scheduling offset based on the scheduled component carrier numerology may reduce complexity when integrating these techniques with some other cross-carrier scheduling techniques. For example, the minimum scheduling offset may be defined according to a delta and a quantization, which may be based on the scheduled component carrier slot. Further, the second example may provide fine granularity definition for the earliest possible schedulable slot 325.

In an example applying the second example to the cross-slot scheduling configuration 301, the minimum scheduling offset, X, may be set to 8. DCI 315-b, transmitted in slot 0 of downlink carrier 305-b, may schedule slot 325-b in the eighth slot of schedulable carrier 310-b at the earliest. In an example applying the second example to the cross-slot scheduling configuration 301, the minimum scheduling offset, X, may be set to 1. DCI 315-b, transmitted in slot 0 of downlink carrier 305-b, may, at the earliest, schedule slot 325-b in slot 1 of schedulable carrier 310-b.

In some cases of the second example, such as for a low SCS carrier scheduling a high SCS carrier, a minimum scheduling offset may only be well defined for certain situations. For example, K0 numbering may be with respect to the first slot that overlaps with the scheduling slot. Additionally, or alternatively, the K0 reference may be the same regardless of the position of the PDCCH. For example, if the PDCCH occasion is late in the scheduling slot, or there are multiple PDCCH occasions within a slot, the K0 of the second example may not be well defined. To ensure similar time delay from the PDCCH to the scheduled slot, a much larger minimum K0 may be over-provisioned. Some examples of over-provisioned scheduling gaps are described with reference to FIG. 4.

Figure 4:
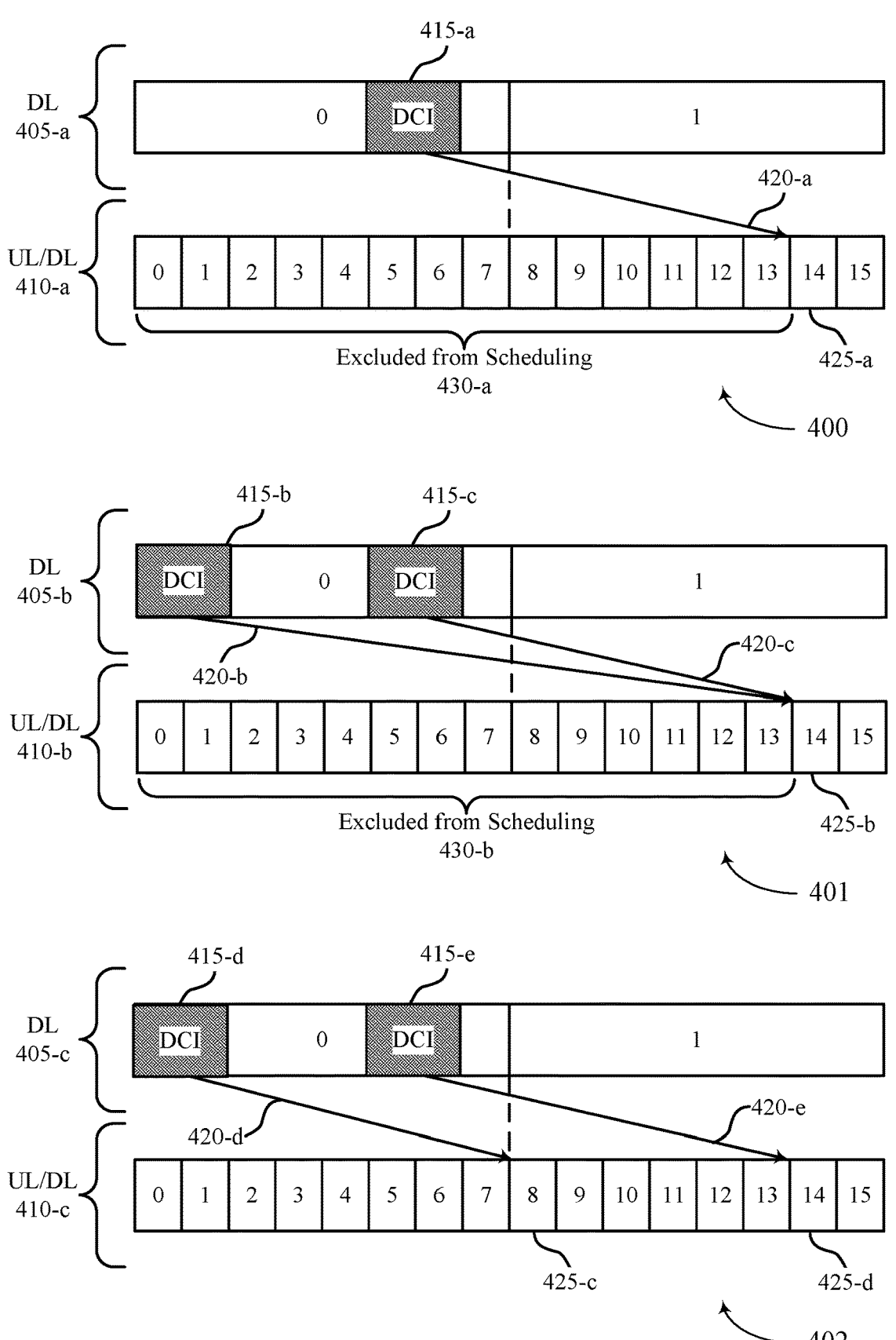

FIG. 4 illustrates an example of cross-slot scheduling configurations 400, 401, and 402 that support cross-slot scheduling for cross numerology in accordance with aspects of the present disclosure. In some examples, cross-slot scheduling configurations 400, 401, and 402 may implement aspects of wireless communication system 100.

Cross-slot scheduling configurations 400, 401, and 402 may each show an example of cross-slot scheduling where the scheduling carrier has a different numerology than the scheduled carrier. For example, a base station 105 may transmit a grant on PDCCH of a downlink carrier 405 to schedule a schedulable carrier 410, where the schedulable carrier 410 has a different numerology (e.g., SCS, slot configuration, etc.) than the downlink carrier 405. Generally, a base station 105 may transmit DCI 415 on a downlink control channel, such as PDCCH. The DCI 415 may include a grant which may schedule resources on the schedulable carrier 410 (e.g., shown by a scheduling 420). In some cases, the grant, if included, may schedule resources in at least a subsequent slot (e.g., with a scheduling gap, K0 or K2, which is greater than zero), and not in the same slot.

The cross-slot scheduling configurations 400, 401, and 402 may implement techniques to support a minimum scheduling offset. The minimum scheduling offset may enable UEs 115 implementing the cross-slot scheduling configurations 400, 401, and 402 to enter an extended microsleep as described in FIG. 2. By determining scheduling information in advance (e.g., cross-slot) and implementing the minimum scheduling offset, a UE 115 may operate in a low power state (e.g., by turning off some RF circuitry or some front-end hardware) for symbol periods where the UE 115 is not scheduled for a transmission. The UE 115 may determine an earliest possible schedulable slot 425 that may be scheduled by the grant in the DCI 415. Before the earliest possible schedulable slot 425 may be a set of slots 430 which cannot be scheduled by a grant in the DCI 415, per the minimum scheduling offset. The set of slots 430 may, however, be scheduled by a previously received DCI (e.g., in a previous slot not shown).

Cross-slot scheduling configurations 400, 401, and 402 may each show an example where the downlink carrier 405 has a lower SCS than schedulable carrier 410. For example, downlink carrier 405-a may have an SCS of 15 KHz, and schedulable carrier 410-a may have an SCS of 120 KHz. In some other examples, the downlink carrier 405 may have a larger SCS than the schedulable carrier 410, or the ratio between the SCS of the downlink carrier 405 and the SCS of the schedulable carrier 410 may be different.

The cross-slot scheduling configurations 400 and 401 may show examples where a minimum scheduling gap is over-provisioned. As described in FIG. 3, there may be situations where defining the minimum scheduling offset based on the numerology of the schedulable carrier 410 may lead to an over-provisioned scheduling offset. Generally, an over-provisioned scheduling offset may lead to a significantly larger set of slots 430 which are excluded from scheduling. This may lead to increased latency for the data.

In some cases, the UE 115 may decide to go into the low power state right after the end of the DCI 415, as the UE 115 may know that even if the DCI 415 carries a scheduling grant, the grant may schedule resources in a later slot (e.g., in the future). The UE 115 may determine to go into the low power state without waiting for the PDCCH processing and decoding of the DCI 415.

In the cross-slot scheduling configuration 400, DCI 415-a may be transmitted later in slot 0, not right at the beginning symbol period. For example, DCI 415-a may be transmitted during slot 5 and 6 of schedulable carrier 410-a. However, in some cases, the minimum scheduling offset may be numbered with respect to the first slot of the schedulable carrier 410-a that overlaps with the scheduling slot. In an example of a downlink data transmission based on the cross-slot scheduling configuration 400, the UE 115 may identify that the minimum K0 is equal to 14, interpreted based on the PDSCH numerology. In this example, all of slots 0 through 13 may be included in set of slots 430-a which are excluded from scheduling. In this example of an over-provisioned minimum scheduling offset, some of the earlier slots on the schedulable carrier 410-a could have been scheduled for transmission, or UE 115 could be operating in a low power state from slot 8 through slot 13.

In the cross-slot scheduling configuration 401, a base station 105 may transmit both DCI 415-b and DCI 415-c at different points in slot 0 of the downlink carrier 405-b. For example, DCI 415-b may be transmitted during slot 0 and 1 of schedulable carrier 410-b, and DCI 415-c may be transmitted during slot 5 and 6 of schedulable carrier 410-b. In some cases, the minimum scheduling offset may be the same regardless of the position of the PDCCH. For example, DCI 415-c may be very late in the slot, but to ensure a similar time delay from the latest PDCCH occasion, a much larger minimum scheduling offset may be over-provisioned. Therefore, DCI 415-b and DCI 415-c may indicate the same minimum scheduling offset. In an example of a downlink data transmission in cross-slot scheduling configuration 401, the UE 115 may determine that the minimum K0 is equal to 14, interpreted based on the PDSCH numerology. In this example, both DCI 415-b and DCI 415-c may indicate the minimum K0 of 14.

The cross-slot scheduling configuration 402 may be an example case, where the two DCI 415 may indicate different minimum scheduling offsets. For example, DCI 415-d may indicate a minimum scheduling offset of X=8, and DCI 415-e may indicate a minimum scheduling offset of X=14. According to the cross-slot scheduling configuration 402, the UE 115 may then either communicate data starting at slot 425-c or operate in a low power state at slot 425-c until slot 425-d. Then, based on whether or not the UE 115 receives a grant in DCI 415-e, the UE 115 may either be in the low power state from slot 425-d, or the UE 115 may be scheduled to communicate data starting as early as slot 425-d.

Figure 5:
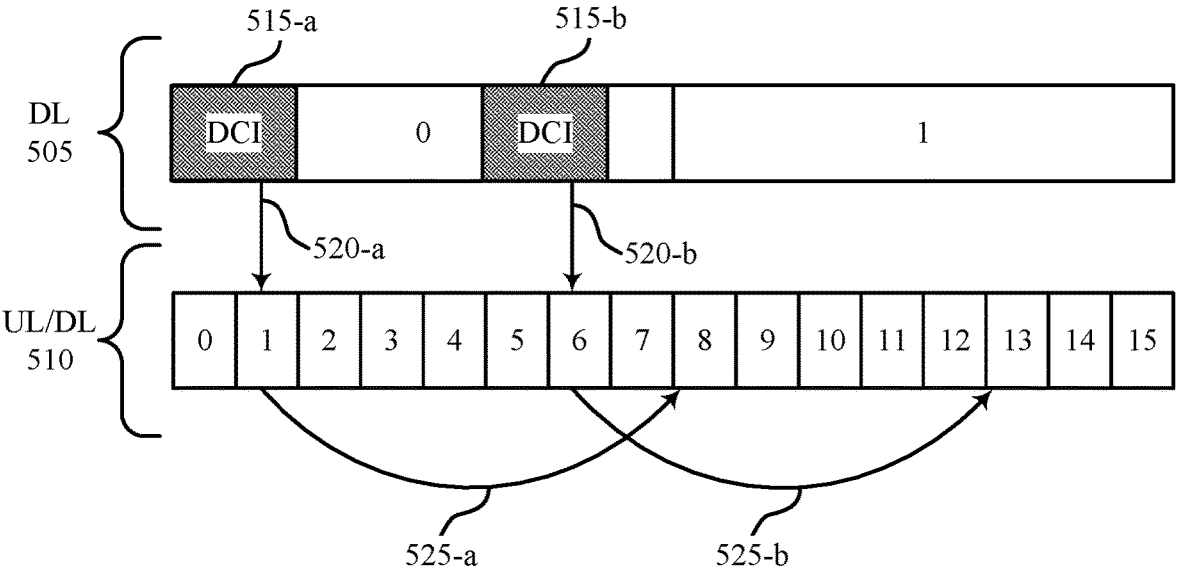

FIG. 5 illustrates an example of a cross-slot scheduling configuration 500 that supports cross-slot scheduling for cross numerology in accordance with aspects of the present disclosure. In some examples, cross-slot scheduling configuration 500 may implement aspects of wireless communication system 100.

The cross-slot scheduling configuration 500 may show an example of cross-slot scheduling where the scheduling carrier has a different numerology than the scheduled carrier. For example, a base station 105 may transmit a grant on PDCCH of a downlink carrier 505 to schedule a schedulable carrier 510, where the schedulable carrier 510 has a different numerology (e.g., SCS, slot configuration, etc.) than the downlink carrier 505. In some cases, the downlink carrier 505 may schedule a shared channel on the schedulable carrier 510 for a data transmission. For example, if the schedulable carrier 510 is an uplink carrier, the shared channel may be an example of PUSCH. Or, if the schedulable carrier 510 is a downlink carrier, the shared channel may be an example of PDSCH. Generally, a base station 105 may transmit DCI 515 on a downlink control channel, such as PDCCH. The DCI 515 may include a grant which schedules resources on the schedulable carrier 510. The grant, if included, may schedule resources in at least a subsequent slot (e.g., with a scheduling gap, K0 or K2, which is greater than zero), and not in the same slot.

The cross-slot scheduling configuration 500 may implement techniques to support a minimum scheduling offset. The minimum scheduling offset may enable UEs 115 implementing the cross-slot scheduling configuration 500 to enter an extended microsleep as described in FIG. 2. By determining scheduling information in advance (e.g., cross-slot) and implementing the minimum scheduling offset, a UE 115 may operate in a low power state (e.g., by turning off some RF circuitry or some front-end hardware) for symbol periods where the UE 115 is not scheduled for a transmission. The UE 115 may determine an earliest slot that can be scheduled by the grant in the DCI 515. Slots before this determined slot may not be able to be scheduled by a grant in the DCI 515, per the minimum scheduling offset. Earlier slots may, however, be scheduled by a previously received DCI (e.g., in a previous slot not shown).

The cross-slot scheduling configuration 500 may show an example where the downlink carrier 505 has a lower SCS than schedulable carrier 510. For example, the downlink carrier 505 may have an SCS of 15 KHz, and schedulable carrier 510 may have an SCS of 120 KHz. In some other examples, the downlink carrier 505 may have a larger SCS than the schedulable carrier 510. Generally, the SCS of the downlink carrier 505, the SCS of the schedulable carrier 510, or the SCS of both, may be different.

The cross-slot scheduling configuration 500 may show an example of a relative definition for a minimum scheduling offset. For cross-carrier scheduling with different numerologies, the minimum scheduling offset may be defined based on a relative timing difference between the scheduling PDCCH and the scheduled shared channel (e.g., scheduled PDSCH, scheduled PUSCH), instead of directly defining based on a scheduling gap such as K0 or K2. For example, if a PDCCH occasion falls on slot 5-6 of the scheduled component carrier, and the minimum scheduling offset is 7 slots (e.g., described in terms of the numerology of the scheduled component carrier), then the earliest scheduled PDSCH would not be earlier than slot 13, i.e., slot 6 with a 7 slot minimum offset. This may be different from defining a minimum scheduling offset based on K0, where instead a minimum K0 value would be indicated as 13. The same minimum scheduling offset may be used for other PDCCH occasions.

In an example, DCI 515-a may indicate a minimum scheduling offset of 7. A UE 115 may receive DCI 515-a and map (e.g., at 520-a) when DCI 515-a was received to slots 0 and 1 of the schedulable carrier 510. The UE 115 may determine, based on receiving DCI 515-a at the same time as slot 1 of the schedulable carrier 510 and the minimum scheduling offset of 7, that the earliest slot 525-a that can be scheduled by DCI 515-a would be slot 8 (e.g., DCI 515-a is received in slot 1 with a 7 slot minimum scheduling offset). The UE 115 may receive DCI 515-b in the same slot. The UE 115 may map (e.g., at 520-b) when DCI 515-b was received to slots 5 and 6 of the schedulable carrier 510. Using the same minimum scheduling offset, the UE 115 may determine that the earliest slot 525-b that can be scheduled by DCI 515-b would be slot 13 (e.g., DCI 515-b is received in slot 6 with a 7 slot minimum scheduling offset). In some cases, the scheduling offset itself may indicate whether the scheduling offset is defined by the first numerology or second numerology. Or, in some cases, the definition of the minimum scheduling offset may be preconfigured or stored in memory at the UE 115.

The techniques of the cross-slot scheduling configuration 500 may increase throughput (e.g., if the UE 115 is scheduled for a transmission) or extend the duration of microsleep for the UE 115. In some cases, the techniques for the cross-slot scheduling configuration 500 may prevent the over-provisioning described with reference to some examples of FIG. 4. In some cases, the application time of minimum scheduling offset change may implement similar techniques or use a similar definition. For example, the base station 105 may signal or reconfigure the application time of the minimum scheduling offset change, and the UE 115 may apply the minimum scheduling offset change to slots occurring after the allocation time.

Figure 6:
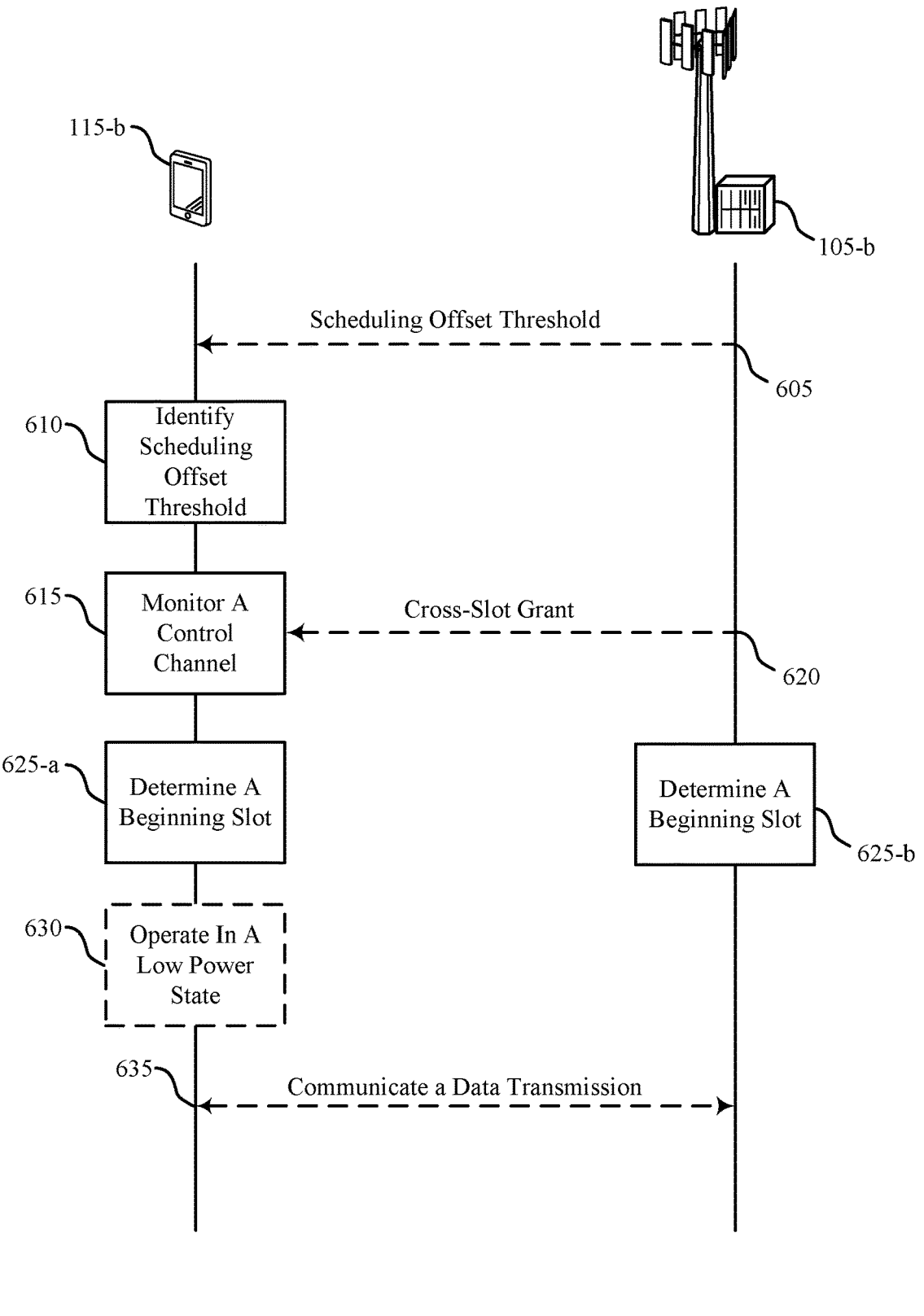
FIG. 6 illustrates an example of a process flow that supports cross-slot scheduling for cross numerology in accordance with aspects of the present disclosure.

FIG. 6 illustrates an example of a process flow 600 that supports cross-slot scheduling for cross numerology in accordance with aspects of the present disclosure. In some examples, process flow 600 may implement aspects of wireless communication system 100. Process flow 600 may include UE 115-b and base station 105-b, which may be respective examples of a UE 115 and a base station 105 as described herein.

At 605, base station 105-b may, in some cases, transmit control signaling that indicates a scheduling offset threshold corresponding to a cross-slot grant. The scheduling offset threshold may be an example of a minimum scheduling offset as described herein. The scheduling offset threshold may indicate a minimum number of slots which offset a scheduled shared channel from a scheduling PDCCH. In some cases, the scheduling offset threshold may be one slot or more, such that the scheduling offset threshold (e.g., the minimum scheduling offset) prevents same-slot scheduling and enables only cross-slot scheduling.

At 610, UE 115-b may identify the scheduling offset threshold corresponding to the cross-slot grant. In some cases, UE 115-b may receive multiple different candidate scheduling offset thresholds from local storage of UE 115-b, the multiple different candidate scheduling offset thresholds being preconfigured (e.g., in a technical specification, by prior signaling from the base station 105-b, etc.). In some cases, UE 115-b may receive the layer one control signaling indicating the scheduling offset threshold from the multiple different candidate scheduling offset thresholds. In some cases, the scheduling offset threshold may correspond to a minimum scheduling offset (e.g., in a number of slots) or a minimum applicable value.

At 615, UE 115-b may monitor a control channel in a first slot for the cross-slot grant, the control channel having a first numerology that is different than a second numerology of a shared channel. In some cases, the scheduling offset threshold identified at 610 may indicate a number of slots defined in the first numerology. Or, in some cases, the scheduling offset threshold may indicate a number of slots defined in the second numerology. In some cases, the scheduling offset itself may indicate whether the scheduling offset is defined by the first numerology or second numerology. Or, in some cases, the definition of the minimum scheduling offset may be preconfigured or stored in memory at UE 115-b. The control channel may be an example of a scheduling PDCCH described herein, which may carry a cross-slot grant to schedule a shared channel that has a different numerology.

At 620, base station 105-b may, in some cases, transmit, in a first slot, the cross-slot grant in a control channel that has the first numerology that is different from the second numerology of the shared channel. In some examples, UE 115-b may receive the cross-slot grant via a first component carrier that is defined in the first numerology. In some cases, the cross-slot grant may schedule the data transmission on the shared channel via a second component carrier that is defined in the second numerology. This may be an example of cross-component carrier scheduling, where the two component carriers have different numerologies.

Or, in some cases, UE 115-b may receive the cross-slot grant in a downlink bandwidth part having the first numerology, the cross-slot grant scheduling the data transmission as an uplink transmission on the shared channel in an active uplink bandwidth part having the second numerology. This may be an example of a downlink BWP having a different numerology than an uplink BWP, which may be described in more detail with reference to FIG. 2. In some examples, the cross-slot grant may additionally, or alternatively, schedule a target uplink BWP with the second numerology to initiate uplink BWP switching.

In some cases, UE 115-b may receive the cross-slot grant in a downlink bandwidth part having the first numerology, the cross-slot grant scheduling the data transmission as a downlink transmission on the shared channel in a target downlink bandwidth part having the second numerology. In some cases, this may be an example of BWP switching for downlink, where the shared channel is a downlink shared channel (e.g., PDSCH) which is scheduled for a target BWP.

At 625-a, UE 115-b may determine a beginning slot defined in the second numerology based on the scheduling offset threshold. For example, UE 115-b may determine the beginning slot based on interpreting the scheduling offset threshold as being defined in the first numerology or the second numerology. Base station 105-b may similarly determine the beginning slot at 625-b. For example, the minimum scheduling offset may be defined based on the numerology of the scheduling PDCCH or based on the numerology of the scheduled shared channel.

In some cases, UE 115-*b* may convert the scheduling offset threshold to a second scheduling offset threshold in the second numerology. For example, the scheduling offset threshold may be defined in the first numerology, and UE 115-*b* may determine the beginning slot based on the second scheduling offset threshold. This may be an example of converting the scheduling offset threshold from the numerology of the scheduling PDCCH to the numerology of the scheduled shared channel, for example by applying Equation (1) or Equation (2) described with reference to FIG. 2. Some examples of this conversion for cross-carrier scheduling may be described with reference to FIG. 3.

In some examples, UE 115-*b* may determine the beginning of the slot relative to the control channel based on the scheduling offset threshold. In this example, UE 115-*b* may determine the beginning slot based on when the cross-slot grant is received. An example of this may be described in more detail with reference to FIG. 5.

UE 115-*b* may then either operate in a low power state or communicate a data transmission during the beginning slot based on whether UE 115-*b* detected the cross-slot grant. For example, if base station 105-*b* did not transmit the cross-slot grant at 620, UE 115-*b* may be able to enter a low power mode (e.g., go into microsleep) starting at the beginning slot at 630. For example, UE 115-*b* may operate in the low power state based on determining that the cross-slot grant has not been detected.

Or, if base station 105-*b* did transmit the cross-slot grant, UE 115-*b* may be scheduled to communicate data. Therefore, UE 115-*b* may wait until the first scheduled slot to begin communicating data, then start communicating the data transmission based on detecting the cross-slot grant at 635. In some cases, the first slot for the data transmission may be the same or different as the beginning slot as determined at 625.

Figure 7:
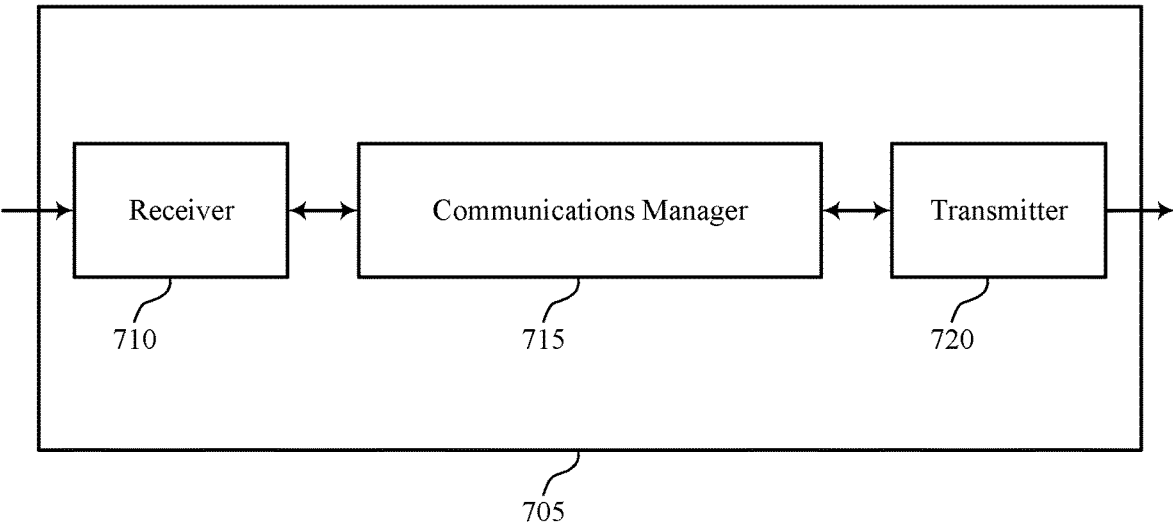
FIGS. 7 and 8 show block diagrams of devices that support cross-slot scheduling for cross numerology in accordance with aspects of the present disclosure.

FIG. 7 shows a block diagram 700 of a device 705 that supports cross-slot scheduling for cross numerology in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to cross-slot scheduling for cross numerology, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a scheduling offset threshold corresponding to a cross-slot grant, monitor a control channel in a first slot for the cross-slot grant, the control channel having a first numerology that is different than a second numerology of a shared channel, determine a beginning slot defined in the second numerology based on interpreting the scheduling offset threshold as being defined in the first numerology or the second numerology, and operate in a low power state, or communicating a data transmission, during the beginning slot based on whether the cross-slot grant is detected. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 715 as described herein may be implemented to realize one or more potential advantages. One implementation may allow a UE 115 to save power and increase battery life by staying in a low power mode and powering down some RF and front-end hardware functionalities. Additionally, or alternatively, the UE 115 may further reduce the extent in which it processes PDCCH signaling while in a full power mode, as the UE 115 may instead perform the PDCCH processing while in the low power mode. These power saving advantages may be realized without a significant decrease in throughput for the UE 115.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:

FIG. 8 shows a block diagram 800 of a device 805 that supports cross-slot scheduling for cross numerology in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to cross-slot scheduling for cross numerology, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a scheduling offset threshold identifying component 820, a control channel monitoring component 825, a beginning slot determining component 830, and a low power state component 835. The communications manager 815 may be an example of aspects of the communications manager 1010 described herein.

The scheduling offset threshold identifying component 820 may identify a scheduling offset threshold corresponding to a cross-slot grant.

The control channel monitoring component 825 may monitor a control channel in a first slot for the cross-slot grant, the control channel having a first numerology that is different than a second numerology of a shared channel.

The beginning slot determining component 830 may determine a beginning slot defined in the second numerology based on interpreting the scheduling offset threshold as being defined in the first numerology or the second numerology.

The low power state component 835 may operate in a low power state, or communicating a data transmission, during the beginning slot based on whether the cross-slot grant is detected.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
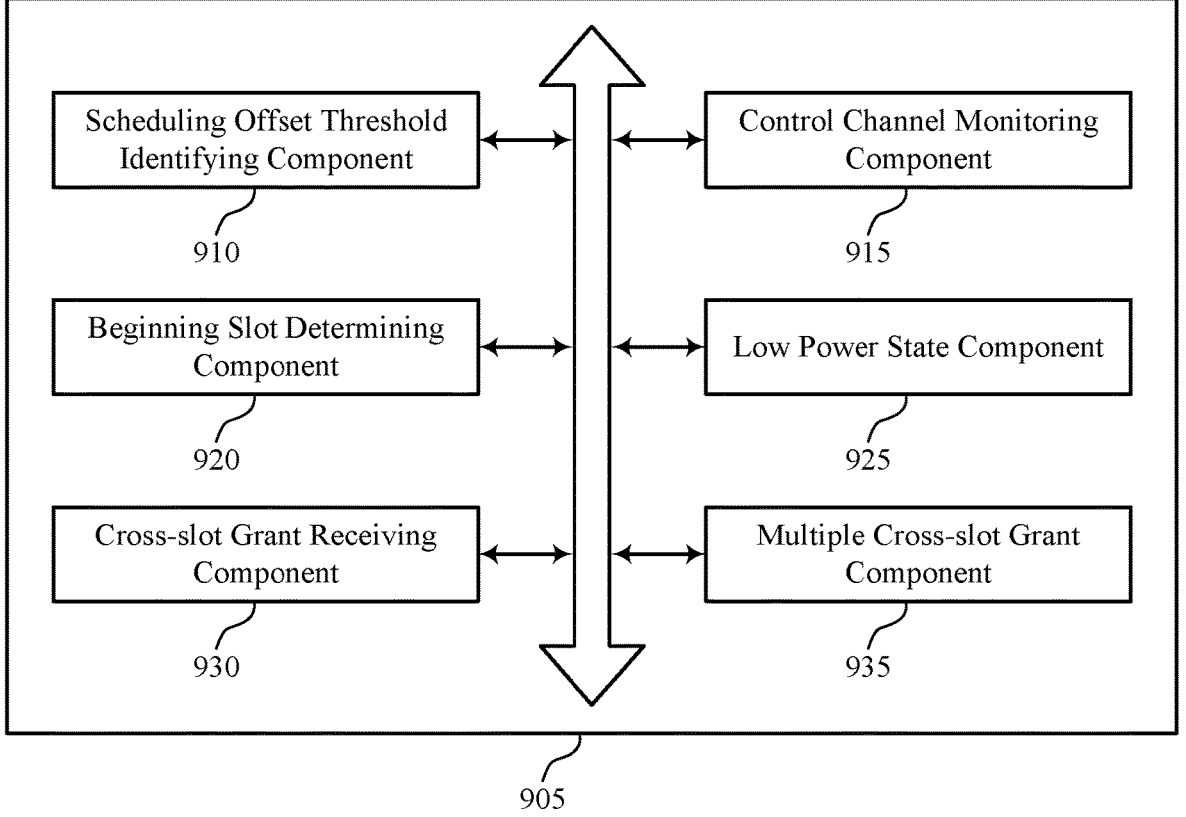
FIG. 9 shows a block diagram of a communications manager that supports cross-slot scheduling for cross numerology in accordance with aspects of the present disclosure.

FIG. 9 shows a block diagram 900 of a communications manager 905 that supports cross-slot scheduling for cross numerology in accordance with aspects of the present disclosure. The communications manager 905 may be an example of aspects of a communications manager 715, a communications manager 815, or a communications manager 1010 described herein. The communications manager 905 may include a scheduling offset threshold identifying component 910, a control channel monitoring component 915, a beginning slot determining component 920, a low power state component 925, a cross-slot grant receiving component 930, and a multiple cross-slot grant component 935. Each of these modules may communicate, directly or indirectly, with one another (e.g., via one or more buses).

The scheduling offset threshold identifying component 910 may identify a scheduling offset threshold corresponding to a cross-slot grant.

In some examples, the scheduling offset threshold identifying component 910 may retrieve a set of different candidate scheduling offset thresholds from local storage of the UE, the set of different candidate scheduling offset thresholds being preconfigured.

In some examples, the scheduling offset threshold identifying component 910 may receive layer one control signaling indicating the scheduling offset threshold from the set of different candidate scheduling offset thresholds.

In some examples, the scheduling offset threshold identifying component 910 may interpret the scheduling offset threshold as being defined in the first numerology or the second numerology based at least in part on a preconfiguration or received control signaling (e.g., from base station 105).

In some cases, the scheduling offset threshold indicates a number of slots defined in the first numerology.

In some cases, the scheduling offset threshold indicates a number of slots defined in the second numerology.

In some cases, the scheduling offset threshold corresponds to a minimum scheduling offset or a minimum applicable value.

The control channel monitoring component 915 may monitor a control channel in a first slot for the cross-slot grant, the control channel having a first numerology that is different than a second numerology of a shared channel.

In some cases, the control channel of the first slot includes a beginning symbol period of the first slot, and where the scheduling offset threshold indicates a number of symbol periods defined in the second numerology relative to the control channel.

The beginning slot determining component 920 may determine a beginning slot defined in the second numerology based on interpreting the scheduling offset threshold as being defined in the first numerology or the second numerology.

In some examples, the beginning slot determining component 920 may convert the scheduling offset threshold to a second scheduling offset threshold in the second numerology, the scheduling offset threshold being defined in the first numerology.

In some examples, the beginning slot determining component 920 may determine the beginning slot based on the second scheduling offset threshold.

In some examples, the beginning slot determining component 920 may determine the beginning slot relative to the control channel based on the scheduling offset threshold.

In some examples, the beginning slot determining component 920 may determine the beginning slot based on the scheduling offset threshold and a second scheduling offset indicated in the cross-slot grant.

In some examples, the beginning slot determining component 920 may determine that the cross-slot grant is invalid based on the second scheduling offset having a shorter duration than the scheduling offset threshold.

In some examples, the beginning slot determining component 920 may operate in the low power state based on determining that the cross-slot grant is invalid.

In some cases, the control channel of the first slot occurs after a beginning symbol period of the first slot, and where the scheduling offset threshold indicates a number of symbol periods defined in the second numerology relative to a beginning of the control channel.

The low power state component 925 may operate in a low power state, or communicating a data transmission, during the beginning slot based on whether the cross-slot grant is detected.

In some examples, the low power state component 925 may operate in the low power state based on determining that the cross-slot grant has not been detected.

In some examples, the low power state component 925 may receive or transmitting the data transmission based on receiving the cross-slot grant.

In some examples, the low power state component 925 may control at least one radio frequency chain to operate in the low power state based on whether the cross-slot grant is detected.

The cross-slot grant receiving component 930 may receive the cross-slot grant in a downlink bandwidth part having the first numerology, the cross-slot grant scheduling the data transmission as an uplink transmission on the shared channel in an active uplink bandwidth part having the second numerology.

In some examples, the cross-slot grant receiving component 930 may switch from a first uplink bandwidth part to the active uplink bandwidth part based on receiving the cross-slot grant.

In some examples, the cross-slot grant receiving component 930 may receive the cross-slot grant in a downlink bandwidth part having the first numerology, the cross-slot grant scheduling the data transmission as a downlink transmission on the shared channel in a target downlink bandwidth part having the second numerology.

In some examples, the cross-slot grant receiving component 930 may switch from a first downlink bandwidth part to the target downlink bandwidth part based on receiving the cross-slot grant.

In some examples, the cross-slot grant receiving component 930 may receive the cross-slot grant via a first component carrier that is defined in the first numerology, the cross-slot grant scheduling the data transmission on the shared channel via a second component carrier that is defined in the second numerology.

The multiple cross-slot grant component 935 may receive, via a second control channel of the first slot, a second cross-slot grant.

In some examples, the multiple cross-slot grant component 935 may determine the beginning slot relative to the control channel based on the scheduling offset threshold and a second scheduling offset indicated in the cross-slot grant.

In some examples, the multiple cross-slot grant component 935 may determine a second beginning slot relative to the second control channel based on the scheduling offset threshold and a third scheduling offset indicated in the second cross-slot grant.

In some examples, the multiple cross-slot grant component 935 may determine the beginning slot relative to the control channel based on the relative timing difference.

In some examples, the multiple cross-slot grant component 935 may determine the second beginning slot of the shared channel relative to the second control channel based on the relative timing difference.

In some examples, the multiple cross-slot grant component 935 may receive control signaling indicating a change to the scheduling offset threshold.

In some examples, the multiple cross-slot grant component 935 may apply the change to the scheduling offset threshold in a slot occurring after the beginning slot.

In some examples, the multiple cross-slot grant component 935 may map an ending symbol period of the control channel to a shared channel slot of the shared channel defined in the second numerology.

In some examples, the multiple cross-slot grant component 935 may determine the beginning slot based on the shared channel slot and the relative timing difference.

In some cases, the scheduling offset threshold indicates a number of symbol periods defined in the second numerology.

In some cases, the scheduling offset threshold indicates a relative timing difference.

Figure 10:
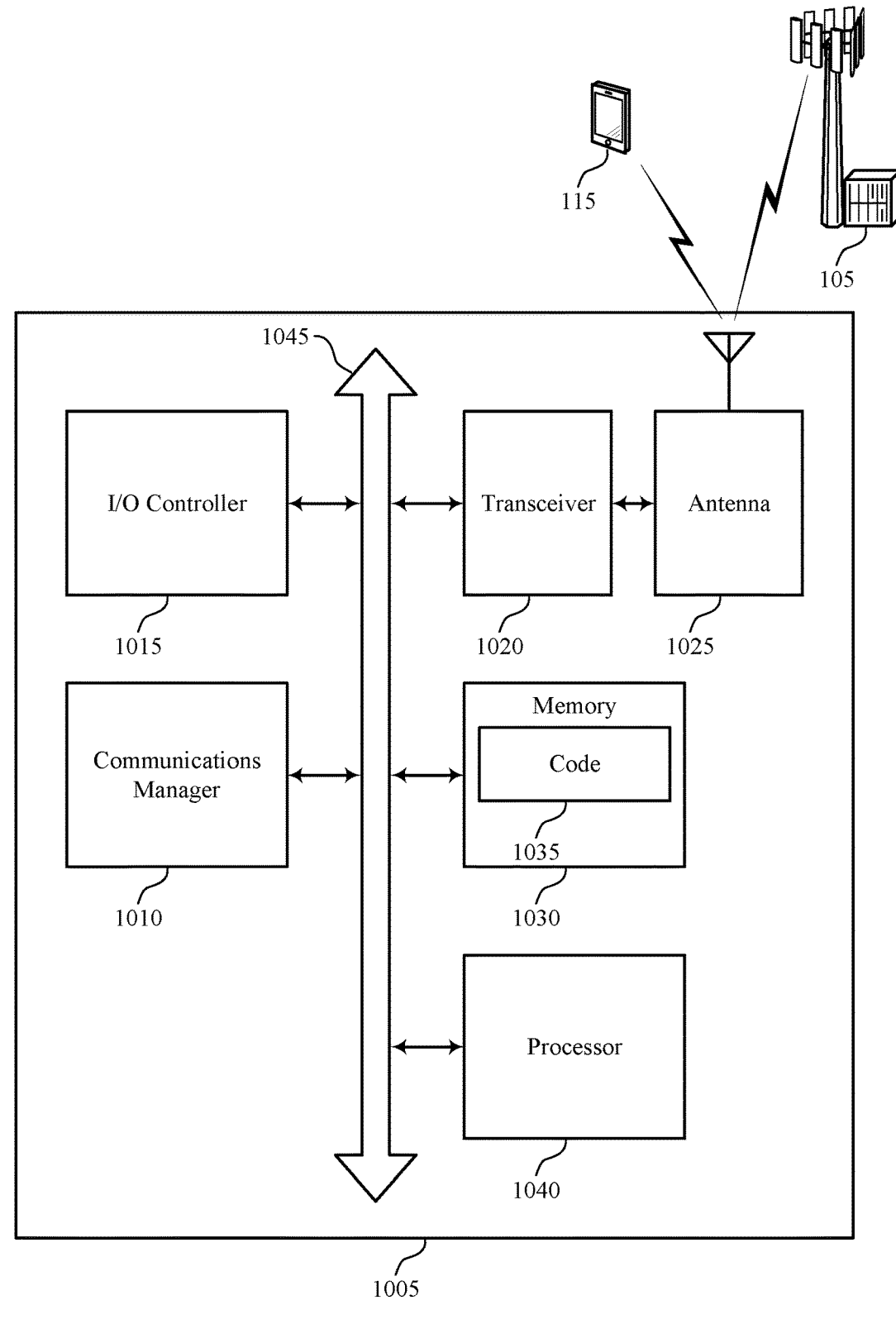
FIG. 10 shows a diagram of a system including a device that supports cross-slot scheduling for cross numerology in accordance with aspects of the present disclosure.

FIG. 10 shows a diagram of a system 1000 including a device 1005 that supports cross-slot scheduling for cross numerology in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory

1030, and a processor 1040. These components may be in electronic communication via one or more buses (e.g., bus 1045).

The communications manager 1010 may identify a scheduling offset threshold corresponding to a cross-slot grant, monitor a control channel in a first slot for the cross-slot grant, the control channel having a first numerology that is different than a second numerology of a shared channel, determine a beginning slot defined in the second numerology based on interpreting the scheduling offset threshold as being defined in the first numerology or the second numerology, and operate in a low power state, or communicating a data transmission, during the beginning slot based on whether the cross-slot grant is detected.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting cross-slot scheduling for cross numerology).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Based on extending the duration of the UE 115 in the power saving mode, a processor of a UE 115 (e.g., controlling the receiver 810, the transmitter 840, or the transceiver 1020 as described with reference to FIG. 10) may be able to save power or reallocate processing power to other functions than monitoring. Further, the RF circuitry may be able to cool down or refrain from using significant power while in the low power mode. This may increase longevity of different components of the device while preserving the device's battery life.

Figure 11:
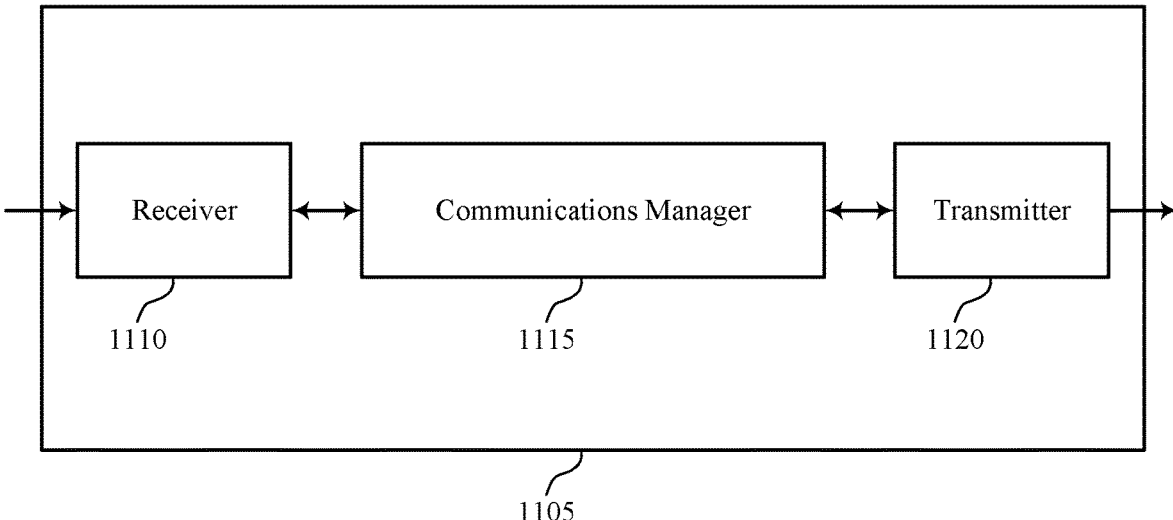
FIGS. 11 and 12 show block diagrams of devices that support cross-slot scheduling for cross numerology in accordance with aspects of the present disclosure.

FIG. 11 shows a block diagram 1100 of a device 1105 that supports cross-slot scheduling for cross numerology in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to cross-slot scheduling for cross numerology, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit control signaling that indicates a scheduling offset threshold corresponding to a cross-slot grant, transmit, in a first slot, the cross-slot grant in a control channel that has a first numerology that is different than a second numerology of a shared channel, determine a beginning slot in the second numerology based on the scheduling offset threshold being defined in the first numerology or the second numerology, and transmit or receiving a data transmission during the beginning slot based on the cross-slot grant. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
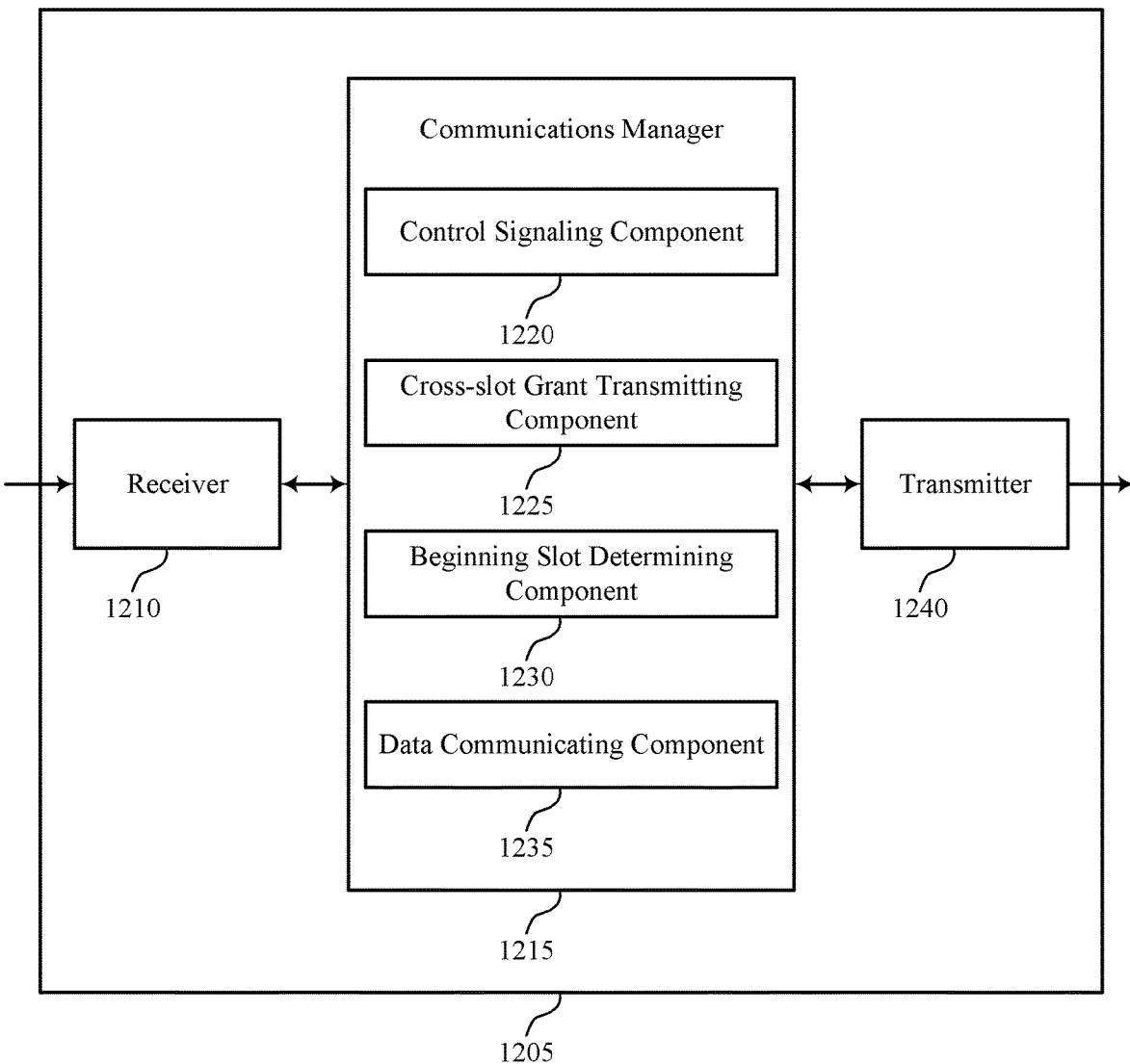

FIG. 12 shows a block diagram 1200 of a device 1205 that supports cross-slot scheduling for cross numerology in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to cross-slot scheduling for cross numerology, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a control signaling component 1220, a cross-slot grant transmitting component 1225, a beginning slot determining component 1230, and a data communicating component 1235. The communications manager 1215 may be an example of aspects of the communications manager 1410 described herein.

The control signaling component 1220 may transmit control signaling that indicates a scheduling offset threshold corresponding to a cross-slot grant.

The cross-slot grant transmitting component 1225 may transmit, in a first slot, the cross-slot grant in a control channel that has a first numerology that is different than a second numerology of a shared channel.

The beginning slot determining component 1230 may determine a beginning slot in the second numerology based on the scheduling offset threshold being defined in the first numerology or the second numerology.

The data communicating component 1235 may transmit or receiving a data transmission during the beginning slot based on the cross-slot grant.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
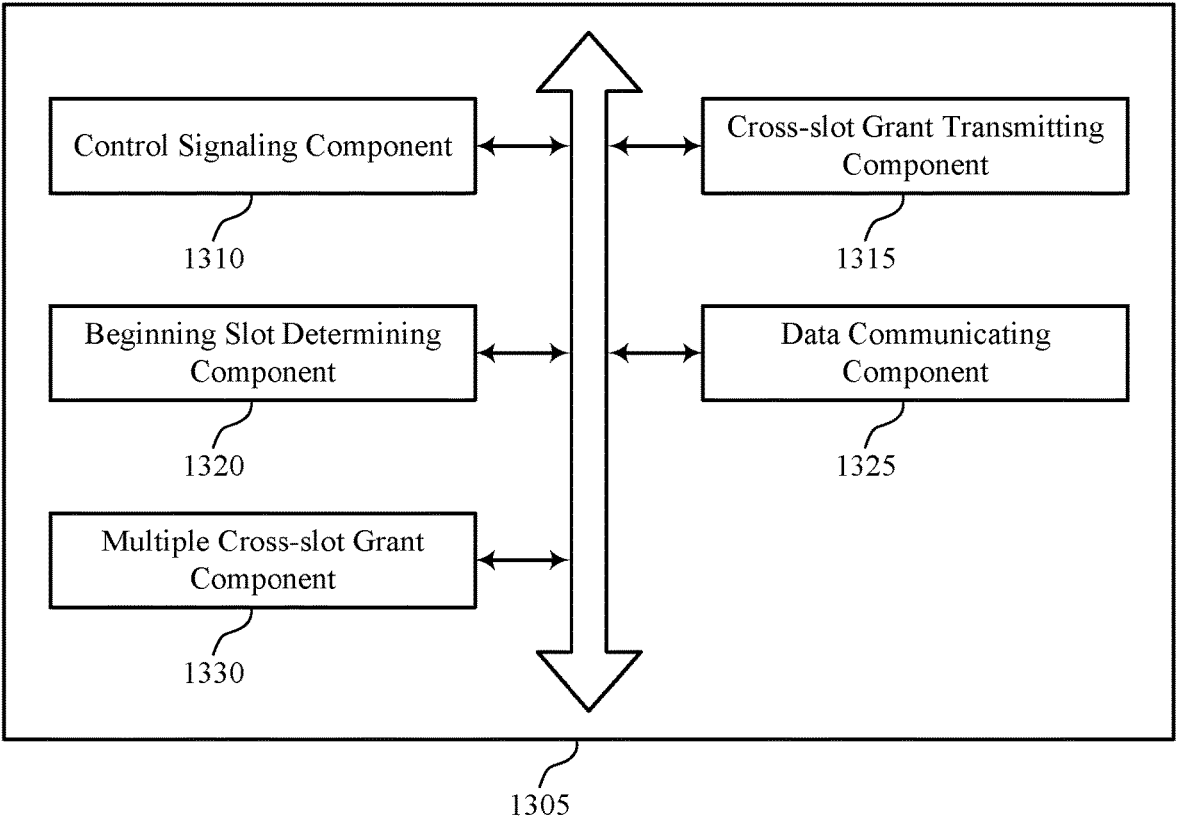
FIG. 13 shows a block diagram of a communications manager that supports cross-slot scheduling for cross numerology in accordance with aspects of the present disclosure.

FIG. 13 shows a block diagram 1300 of a communications manager 1305 that supports cross-slot scheduling for cross numerology in accordance with aspects of the present disclosure. The communications manager 1305 may be an example of aspects of a communications manager 1115, a communications manager 1215, or a communications manager 1410 described herein. The communications manager 1305 may include a control signaling component 1310, a cross-slot grant transmitting component 1315, a beginning slot determining component 1320, a data communicating component 1325, and a multiple cross-slot grant component 1330. Each of these modules may communicate, directly or indirectly, with one another (e.g., via one or more buses).

The control signaling component 1310 may transmit control signaling that indicates a scheduling offset threshold corresponding to a cross-slot grant.

In some examples, the control signaling component 1310 may transmit layer one control signaling indicating the scheduling offset threshold from a set of different candidate scheduling offset thresholds.

In some cases, the scheduling offset threshold indicates a number of slots defined in the first numerology.

In some cases, the scheduling offset threshold indicates a number of slots defined in the second numerology.

In some cases, the scheduling offset threshold is a minimum scheduling offset threshold.

In some cases, the control channel of the first slot occurs after a beginning symbol period of the first slot, and where the scheduling offset threshold indicates a number of symbol periods in the second numerology relative to a beginning of the control channel.

In some cases, the control channel of the first slot includes a beginning symbol period of the first slot, and where the scheduling offset threshold indicates a number of symbol periods defined in the second numerology relative to the control channel.

The cross-slot grant transmitting component 1315 may transmit, in a first slot, the cross-slot grant in a control channel that has a first numerology that is different than a second numerology of a shared channel.

In some examples, the cross-slot grant transmitting component 1315 may transmit the cross-slot grant in a downlink bandwidth part having the first numerology, the cross-slot grant scheduling the data transmission as an uplink transmission on the shared channel in an active uplink bandwidth part having the second numerology.

In some examples, the cross-slot grant transmitting component 1315 may transmit the cross-slot grant in a downlink bandwidth part having the first numerology, the cross-slot grant scheduling the data transmission as a downlink transmission on the shared channel in a target uplink bandwidth part having the second numerology.

In some examples, the cross-slot grant transmitting component 1315 may transmit the cross-slot grant via a first component carrier that is defined in the first numerology, the cross-slot grant scheduling the data transmission on the shared channel via a second component carrier that is defined in the second numerology.

The beginning slot determining component 1320 may determine a beginning slot in the second numerology based on the scheduling offset threshold being defined in the first numerology or the second numerology.

In some examples, the beginning slot determining component 1320 may convert the scheduling offset threshold to a second scheduling offset threshold in the second numerology, the scheduling offset threshold being defined in the first numerology.

In some examples, the beginning slot determining component 1320 may determine the beginning slot based on the second scheduling offset threshold.

In some examples, the beginning slot determining component 1320 may determine the beginning slot relative to the control channel based on the scheduling offset threshold.

The data communicating component 1325 may transmit or receiving a data transmission during the beginning slot based on the cross-slot grant.

The multiple cross-slot grant component 1330 may transmit, via a second control channel of the first slot, a second cross-slot grant.

In some examples, the multiple cross-slot grant component 1330 may determine the beginning slot relative to the control channel based on the scheduling offset threshold and a second scheduling offset indicated in the cross-slot grant.

In some examples, the multiple cross-slot grant component 1330 may determine a second beginning slot relative to the second control channel based on the scheduling offset threshold and a third scheduling offset indicated in the second cross-slot grant.

In some examples, the multiple cross-slot grant component 1330 may determine the beginning slot relative to the control channel based on the relative timing difference.

In some examples, the multiple cross-slot grant component 1330 may determine the second beginning slot of the shared channel relative to the second control channel based on the relative timing difference.

In some examples, the multiple cross-slot grant component 1330 may transmit control signaling indicating a change to the scheduling offset threshold.

In some examples, the multiple cross-slot grant component 1330 may apply the change to the scheduling offset threshold in a slot occurring after the beginning slot.

In some examples, the multiple cross-slot grant component 1330 may map an ending symbol period of the control channel to a shared channel slot of the shared channel defined in the second numerology.

In some examples, the multiple cross-slot grant component 1330 may determine the beginning slot based on the shared channel slot and the relative timing difference.

In some cases, the scheduling offset threshold indicates a number of symbol periods defined in the second numerology.

In some cases, the scheduling offset threshold is a relative timing difference.

Figure 14:
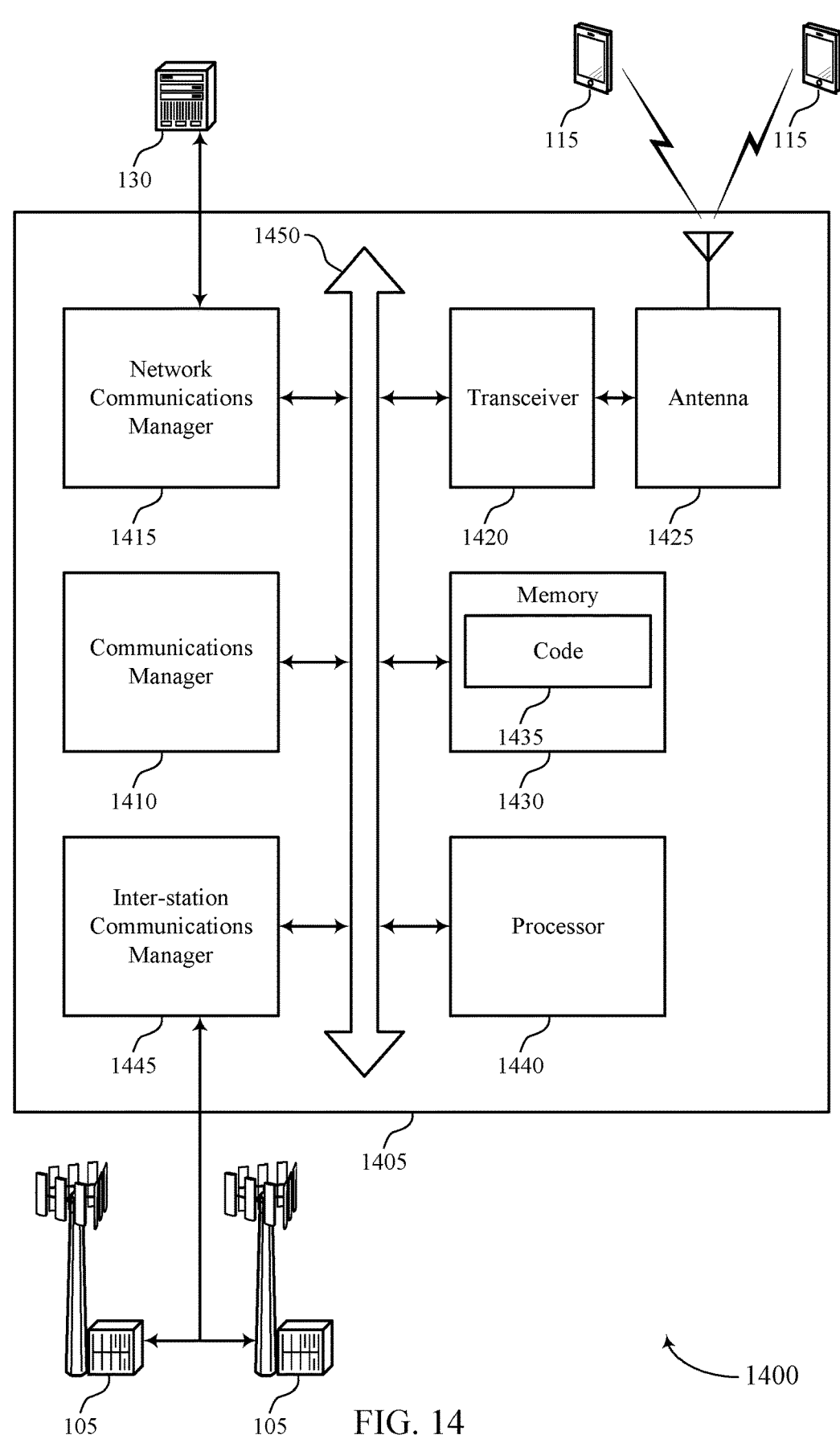
FIG. 14 shows a diagram of a system including a device that supports cross-slot scheduling for cross numerology in accordance with aspects of the present disclosure.

FIG. 14 shows a diagram of a system 1400 including a device 1405 that supports cross-slot scheduling for cross numerology in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit control signaling that indicates a scheduling offset threshold corresponding to a cross-slot grant, transmit, in a first slot, the cross-slot grant in a control channel that has a first numerology that is different than a second numerology of a shared channel, determine a beginning slot in the second numerology based on the scheduling offset threshold being defined in the first numerology or the second numerology, and transmit or receiving a data transmission during the beginning slot based on the cross-slot grant.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting cross-slot scheduling for cross numerology).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
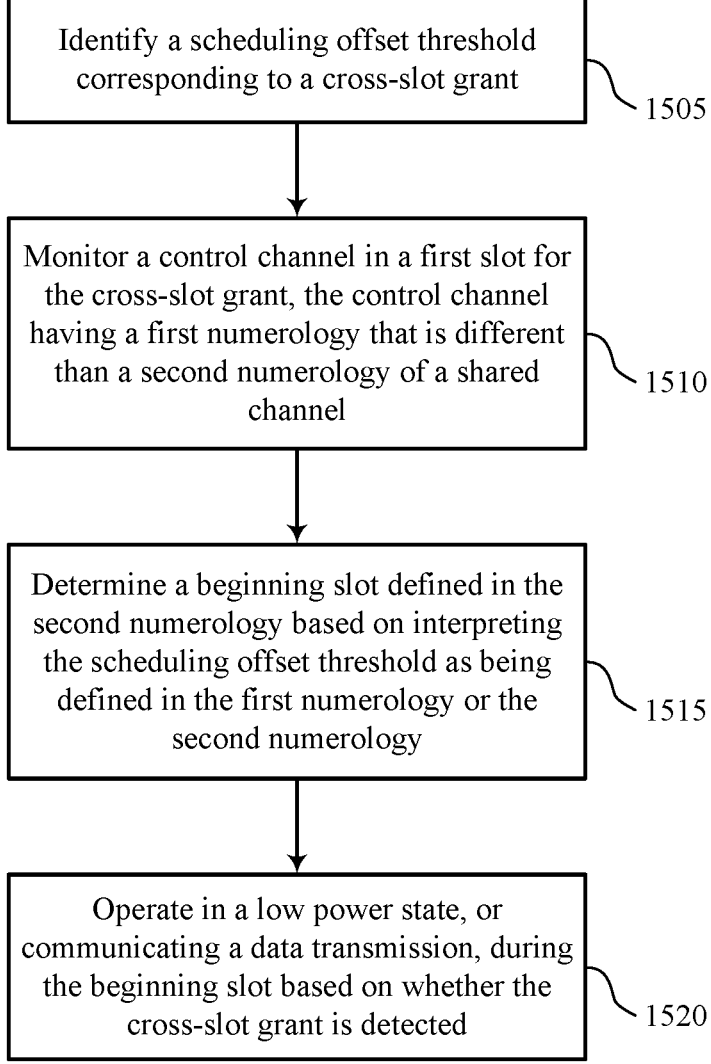

FIG. 15 shows a flowchart illustrating a method 1500 that supports cross-slot scheduling for cross numerology in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may identify a scheduling offset threshold corresponding to a cross-slot grant. The operations of 1505 may be performed according to the methods described herein. In some examples, aspects of the operations of 1505 may be performed by a scheduling offset threshold identifying component as described with reference to FIGS. 7 through 10. Additionally or alternatively, means for performing 1505 may, but not necessarily, include, for example, antenna 1025, transceiver 1020, communications manager 1010, memory 1030 (including code 1035), processor 1040 and/or bus 1045.

At 1510, the UE may monitor a control channel in a first slot for the cross-slot grant, the control channel having a first numerology that is different than a second numerology of a shared channel. The operations of 1510 may be performed according to the methods described herein. In some examples, aspects of the operations of 1510 may be performed by a control channel monitoring component as described with reference to FIGS. 7 through 10. Additionally or alternatively, means for performing 1510 may, but not necessarily, include, for example, antenna 1025, transceiver 1020, communications manager 1010, memory 1030 (including code 1035), processor 1040 and/or bus 1045.

At 1515, the UE may determine a beginning slot defined in the second numerology based on interpreting the scheduling offset threshold as being defined in the first numerology or the second numerology. The operations of 1515 may be performed according to the methods described herein. In some examples, aspects of the operations of 1515 may be performed by a beginning slot determining component as described with reference to FIGS. 7 through 10. Additionally or alternatively, means for performing 1515 may, but not necessarily, include, for example, antenna 1025, transceiver 1020, communications manager 1010, memory 1030 (including code 1035), processor 1040 and/or bus 1045.

At 1520, the UE may operate in a low power state, or communicating a data transmission, during the beginning slot based on whether the cross-slot grant is detected. The operations of 1520 may be performed according to the methods described herein. In some examples, aspects of the operations of 1520 may be performed by a low power state component as described with reference to FIGS. 7 through 10. Additionally or alternatively, means for performing 1520 may, but not necessarily, include, for example, antenna 1025, transceiver 1020, communications manager 1010, memory 1030 (including code 1035), processor 1040 and/or bus 1045.

FIG. 16 shows a flowchart illustrating a method 1600 that supports cross-slot scheduling for cross numerology in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1605, the UE may retrieve a set of different candidate scheduling offset thresholds from local storage of the UE, the set of different candidate scheduling offset thresholds being preconfigured. The operations of 1605 may be performed according to the methods described herein. In some examples, aspects of the operations of 1605 may be performed by a scheduling offset threshold identifying component as described with reference to FIGS. 7 through 10. Additionally or alternatively, means for performing 1605 may, but not necessarily, include, for example, antenna 1025, transceiver 1020, communications manager 1010, memory 1030 (including code 1035), processor 1040 and/or bus 1045.

At 1610, the UE may receive layer one control signaling indicating the scheduling offset threshold from the set of different candidate scheduling offset thresholds. The operations of 1610 may be performed according to the methods described herein. In some examples, aspects of the operations of 1610 may be performed by a scheduling offset threshold identifying component as described with reference to FIGS. 7 through 10. Additionally or alternatively, means for performing 1610 may, but not necessarily, include, for example, antenna 1025, transceiver 1020, communications manager 1010, memory 1030 (including code 1035), processor 1040 and/or bus 1045.

At 1615, the UE may identify a scheduling offset threshold corresponding to a cross-slot grant. The operations of 1615 may be performed according to the methods described herein. In some examples, aspects of the operations of 1615 may be performed by a scheduling offset threshold identifying component as described with reference to FIGS. 7 through 10. Additionally or alternatively, means for performing 1615 may, but not necessarily, include, for example, antenna 1025, transceiver 1020, communications manager 1010, memory 1030 (including code 1035), processor 1040 and/or bus 1045.

At 1620, the UE may monitor a control channel in a first slot for the cross-slot grant, the control channel having a first numerology that is different than a second numerology of a shared channel. The operations of 1620 may be performed according to the methods described herein. In some examples, aspects of the operations of 1620 may be performed by a control channel monitoring component as described with reference to FIGS. 7 through 10. Additionally or alternatively, means for performing 1620 may, but not necessarily, include, for example, antenna 1025, transceiver 1020, communications manager 1010, memory 1030 (including code 1035), processor 1040 and/or bus 1045.

At 1625, the UE may determine a beginning slot defined in the second numerology based on interpreting the scheduling offset threshold as being defined in the first numerology or the second numerology. The operations of 1625 may be performed according to the methods described herein. In some examples, aspects of the operations of 1625 may be performed by a beginning slot determining component as described with reference to FIGS. 7 through 10. Additionally or alternatively, means for performing 1625 may, but not necessarily, include, for example, antenna 1025, transceiver 1020, communications manager 1010, memory 1030 (including code 1035), processor 1040 and/or bus 1045.

At 1630, the UE may operate in a low power state, or communicating a data transmission, during the beginning slot based on whether the cross-slot grant is detected. The operations of 1630 may be performed according to the methods described herein. In some examples, aspects of the operations of 1630 may be performed by a low power state component as described with reference to FIGS. 7 through 10. Additionally or alternatively, means for performing 1630 may, but not necessarily, include, for example, antenna

1025, transceiver 1020, communications manager 1010, memory 1030 (including code 1035), processor 1040 and/or bus 1045.

FIG. 17 shows a flowchart illustrating a method 1700 that supports cross-slot scheduling for cross numerology in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1705, the UE may identify a scheduling offset threshold corresponding to a cross-slot grant. The operations of 1705 may be performed according to the methods described herein. In some examples, aspects of the operations of 1705 may be performed by a scheduling offset threshold identifying component as described with reference to FIGS. 7 through 10. Additionally or alternatively, means for performing 1705 may, but not necessarily, include, for example, antenna 1025, transceiver 1020, communications manager 1010, memory 1030 (including code 1035), processor 1040 and/or bus 1045.

At 1710, the UE may monitor a control channel in a first slot for the cross-slot grant, the control channel having a first numerology that is different than a second numerology of a shared channel. The operations of 1710 may be performed according to the methods described herein. In some examples, aspects of the operations of 1710 may be performed by a control channel monitoring component as described with reference to FIGS. 7 through 10. Additionally or alternatively, means for performing 1710 may, but not necessarily, include, for example, antenna 1025, transceiver 1020, communications manager 1010, memory 1030 (including code 1035), processor 1040 and/or bus 1045.

At 1715, the UE may receive the cross-slot grant in a downlink bandwidth part having the first numerology, the cross-slot grant scheduling the data transmission as an uplink transmission on the shared channel in an active uplink bandwidth part having the second numerology. The operations of 1715 may be performed according to the methods described herein. In some examples, aspects of the operations of 1715 may be performed by a cross-slot grant receiving component as described with reference to FIGS. 7 through 10. Additionally or alternatively, means for performing 1715 may, but not necessarily, include, for example, antenna 1025, transceiver 1020, communications manager 1010, memory 1030 (including code 1035), processor 1040 and/or bus 1045.

At 1720, the UE may determine a beginning slot defined in the second numerology based on interpreting the scheduling offset threshold as being defined in the first numerology or the second numerology. The operations of 1720 may be performed according to the methods described herein. In some examples, aspects of the operations of 1720 may be performed by a beginning slot determining component as described with reference to FIGS. 7 through 10. Additionally or alternatively, means for performing 1720 may, but not necessarily, include, for example, antenna 1025, transceiver 1020, communications manager 1010, memory 1030 (including code 1035), processor 1040 and/or bus 1045.

At 1725, the UE may operate in a low power state, or communicating a data transmission, during the beginning slot based on whether the cross-slot grant is detected. The operations of 1725 may be performed according to the methods described herein. In some examples, aspects of the operations of 1725 may be performed by a low power state component as described with reference to FIGS. 7 through 10. Additionally or alternatively, means for performing 1725 may, but not necessarily, include, for example, antenna 1025, transceiver 1020, communications manager 1010, memory 1030 (including code 1035), processor 1040 and/or bus 1045.

FIG. 18 shows a flowchart illustrating a method 1800 that supports cross-slot scheduling for cross numerology in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1805, the base station may transmit control signaling that indicates a scheduling offset threshold corresponding to a cross-slot grant. The operations of 1805 may be performed according to the methods described herein. In some examples, aspects of the operations of 1805 may be performed by a control signaling component as described with reference to FIGS. 11 through 14. Additionally or alternatively, means for performing 1805 may, but not necessarily, include, for example, antenna 1425, transceiver 1420, communications manager 1410, memory 1430 (including code 1435), processor 1440 and/or bus 1450.

At 1810, the base station may transmit, in a first slot, the cross-slot grant in a control channel that has a first numerology that is different than a second numerology of a shared channel. The operations of 1810 may be performed according to the methods described herein. In some examples, aspects of the operations of 1810 may be performed by a cross-slot grant transmitting component as described with reference to FIGS. 11 through 14. Additionally or alternatively, means for performing 1810 may, but not necessarily, include, for example, antenna 1425, transceiver 1420, communications manager 1410, memory 1430 (including code 1435), processor 1440 and/or bus 1450.

At 1815, the base station may determine a beginning slot in the second numerology based on the scheduling offset threshold being defined in the first numerology or the second numerology. The operations of 1815 may be performed according to the methods described herein. In some examples, aspects of the operations of 1815 may be performed by a beginning slot determining component as described with reference to FIGS. 11 through 14. Additionally or alternatively, means for performing 1815 may, but not necessarily, include, for example, antenna 1425, transceiver 1420, communications manager 1410, memory 1430 (including code 1435), processor 1440 and/or bus 1450.

At 1820, the base station may transmit or receiving a data transmission during the beginning slot based on the cross-slot grant. The operations of 1820 may be performed according to the methods described herein. In some examples, aspects of the operations of 1820 may be performed by a data communicating component as described with reference to FIGS. 11 through 14. Additionally or alternatively, means for performing 1820 may, but not necessarily, include, for example, antenna 1425, transceiver 1420, communications manager 1410, memory 1430 (including code 1435), processor 1440 and/or bus 1450.

FIG. 19 shows a flowchart illustrating a method 1900 that supports cross-slot scheduling for cross numerology in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1905, the base station may transmit layer one control signaling indicating the scheduling offset threshold from a set of different candidate scheduling offset thresholds. The operations of 1905 may be performed according to the methods described herein. In some examples, aspects of the operations of 1905 may be performed by a control signaling component as described with reference to FIGS. 11 through 14. Additionally or alternatively, means for performing 1905 may, but not necessarily, include, for example, antenna 1425, transceiver 1420, communications manager 1410, memory 1430 (including code 1435), processor 1440 and/or bus 1450.

At 1910, the base station may transmit control signaling that indicates a scheduling offset threshold corresponding to a cross-slot grant. The operations of 1910 may be performed according to the methods described herein. In some examples, aspects of the operations of 1910 may be performed by a control signaling component as described with reference to FIGS. 11 through 14. Additionally or alternatively, means for performing 1910 may, but not necessarily, include, for example, antenna 1425, transceiver 1420, communications manager 1410, memory 1430 (including code 1435), processor 1440 and/or bus 1450.

At 1915, the base station may transmit, in a first slot, the cross-slot grant in a control channel that has a first numerology that is different than a second numerology of a shared channel. The operations of 1915 may be performed according to the methods described herein. In some examples, aspects of the operations of 1915 may be performed by a cross-slot grant transmitting component as described with reference to FIGS. 11 through 14. Additionally or alternatively, means for performing 1915 may, but not necessarily, include, for example, antenna 1425, transceiver 1420, communications manager 1410, memory 1430 (including code 1435), processor 1440 and/or bus 1450.

At 1920, the base station may determine a beginning slot in the second numerology based on the scheduling offset threshold being defined in the first numerology or the second numerology. The operations of 1920 may be performed according to the methods described herein. In some examples, aspects of the operations of 1920 may be performed by a beginning slot determining component as described with reference to FIGS. 11 through 14. Additionally or alternatively, means for performing 1920 may, but not necessarily, include, for example, antenna 1425, transceiver 1420, communications manager 1410, memory 1430 (including code 1435), processor 1440 and/or bus 1450.

At 1925, the base station may transmit or receiving a data transmission during the beginning slot based on the cross-slot grant. The operations of 1925 may be performed according to the methods described herein. In some examples, aspects of the operations of 1925 may be performed by a data communicating component as described with reference to FIGS. 11 through 14. Additionally or alternatively, means for performing 1925 may, but not necessarily, include, for example, antenna 1425, transceiver 1420, communications manager 1410, memory 1430 (including code 1435), processor 1440 and/or bus 1450.

FIG. 20 shows a flowchart illustrating a method 2000 that supports cross-slot scheduling for cross numerology in accordance with aspects of the present disclosure. The operations of method 2000 may be implemented by a UE 115 or its components as described herein. For example, the operations of method 2000 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 2005, the UE may identify a scheduling offset threshold corresponding to a cross-slot grant. The operations of 2005 may be performed according to the methods described herein. In some examples, aspects of the operations of 2005 may be performed by a scheduling offset threshold identifying component as described with reference to FIGS. 7 through 10. Additionally or alternatively, means for performing 2005 may, but not necessarily, include, for example, antenna 1025, transceiver 1020, communications manager 1010, memory 1030 (including code 1035), processor 1040 and/or bus 1045.

At 2010, the UE may monitor a control channel in a first slot for the cross-slot grant, the control channel having a first numerology that is different than a second numerology of a shared channel. The operations of 2010 may be performed according to the methods described herein. In some examples, aspects of the operations of 2010 may be performed by a control channel monitoring component as described with reference to FIGS. 7 through 10. Additionally or alternatively, means for performing 2010 may, but not necessarily, include, for example, antenna 1025, transceiver 1020, communications manager 1010, memory 1030 (including code 1035), processor 1040 and/or bus 1045.

At 2015, the UE may determine a beginning slot defined in the second numerology based on the scheduling offset. The operations of 2015 may be performed according to the methods described herein. In some examples, aspects of the operations of 2015 may be performed by a beginning slot determining component as described with reference to FIGS. 7 through 10. Additionally or alternatively, various aspects of determining the beginning slot defined in the second numerology based on the scheduling offset are described with reference to FIGS. 15-19. Additionally or alternatively, means for performing 2015 may, but not necessarily, include, for example, antenna 1025, transceiver 1020, communications manager 1010, memory 1030 (including code 1035), processor 1040 and/or bus 1045.

At 2020, the UE may operate in a low power state, or communicating a data transmission, during the beginning slot based on whether the cross-slot grant is detected. The operations of 2020 may be performed according to the methods described herein. In some examples, aspects of the operations of 2020 may be performed by a low power state component as described with reference to FIGS. 7 through 10. Additionally or alternatively, means for performing 2020 may, but not necessarily, include, for example, antenna 1025, transceiver 1020, communications manager 1010, memory 1030 (including code 1035), processor 1040 and/or bus 1045.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications by a user equipment (UE), comprising:
  one or more memories;
  a transceiver; and
  at least one processor of a user equipment (UE), the at least one processor coupled with the one or more memories and the transceiver and configured to:
    identify a scheduling offset threshold corresponding to a cross-slot grant;
    monitor, via the transceiver, a control channel in a first slot for the cross-slot grant, the control channel having a first numerology that is different than a second numerology of a shared channel;
    map an ending symbol period of the control channel to a shared channel slot of the shared channel defined in the second numerology, wherein the ending symbol period overlaps with the shared channel slot, wherein a duration of the shared channel slot is less than a duration of the first slot;

determine a beginning slot defined in the second numerology based at least in part on the shared channel slot and the scheduling offset threshold; and enter a low power state, or communicate, via the transceiver, a data transmission, during the beginning slot based at least in part on whether the cross-slot grant is detected.

2. The apparatus of claim 1, wherein the scheduling offset threshold corresponds to a minimum scheduling offset or a minimum applicable value.

3. The apparatus of claim 1, wherein the scheduling offset threshold indicates a number of symbol periods defined in the second numerology.

4. The apparatus of claim 1, wherein the at least one processor configured to determine the beginning slot is further configured to:

convert the scheduling offset threshold to a second scheduling offset threshold in the second numerology, the scheduling offset threshold being defined in the first numerology; and determine the beginning slot based at least in part on the shared channel slot and second scheduling offset threshold.

5. The apparatus of claim 1, wherein the at least one processor is further configured to:

receive, via the transceiver, control signaling indicating a change to the scheduling offset threshold.

6. The apparatus of claim 5, wherein the at least one processor is further configured to:

apply the change to the scheduling offset threshold in a slot occurring after the beginning slot.

7. The apparatus of claim 1, wherein the at least one processor is further configured to:

receive, via the transceiver and via a second control channel of the first slot, a second cross-slot grant.

8. The apparatus of claim 7, wherein the at least one processor is further configured to:

map a second ending symbol period of the second control channel to a second shared channel slot of the shared channel defined in the second numerology; and determine a second beginning slot defined in the second numerology based at least in part on the second shared channel slot and the scheduling offset threshold.

9. An apparatus for wireless communications by a network entity, comprising:

one or more memories; and at least one processor of the network entity, the at least one processor coupled with the one or more memories and configured to:

transmit control signaling that indicates a scheduling offset threshold corresponding to a cross-slot grant;

transmit, in a first slot, the cross-slot grant in a control channel that has a first numerology that is different than a second numerology of a shared channel;

map an ending symbol period of the control channel to a shared channel slot of the shared channel defined in the second numerology, wherein the ending symbol period overlaps with the shared channel slot, wherein a duration of the shared channel slot is less than a duration of the first slot;

determine a beginning slot defined in the second numerology based at least in part on the shared channel slot and the scheduling offset threshold; and transmit or receive a data transmission during the beginning slot based at least in part on the cross-slot grant.

10. The apparatus of claim 9, wherein the scheduling offset threshold corresponds to a minimum scheduling offset or a minimum applicable value.

11. The apparatus of claim 9, wherein the scheduling offset threshold indicates a number of symbol periods defined in the second numerology.

12. The apparatus of claim 9, wherein the at least one processor configured to determine the beginning slot is further configured to:

convert the scheduling offset threshold to a second scheduling offset threshold in the second numerology, the scheduling offset threshold being defined in the first numerology; and determine the beginning slot based at least in part on the shared channel slot and second scheduling offset threshold.

13. The apparatus of claim 9, wherein the at least one processor is further configured to:

transmit control signaling indicating a change to the scheduling offset threshold.

14. The apparatus of claim 13, wherein the at least one processor is further configured to:

apply the change to the scheduling offset threshold in a slot occurring after the beginning slot.

15. The apparatus of claim 9, wherein the at least one processor is further configured to:

transmit, via a second control channel of the first slot, a second cross-slot grant.

16. The apparatus of claim 15, wherein the at least one processor is further configured to:

map a second ending symbol period of the second control channel to a second shared channel slot of the shared channel defined in the second numerology; and determine a second beginning slot defined in the second numerology based at least in part on the second shared channel slot and the scheduling offset threshold.

17. A method for wireless communications by a user equipment (UE), comprising:

identifying a scheduling offset threshold corresponding to a cross-slot grant;

monitoring a control channel in a first slot for the cross-slot grant, the control channel having a first numerology that is different than a second numerology of a shared channel;

mapping an ending symbol period of the control channel to a shared channel slot of the shared channel defined in the second numerology, wherein the ending symbol period overlaps with the shared channel slot, wherein a duration of the shared channel slot is less than a duration of the first slot;

determining a beginning slot defined in the second numerology based at least in part on the shared channel slot and the scheduling offset threshold; and entering a low power state, or communicating a data transmission, during the beginning slot based at least in part on whether the cross-slot grant is detected.

18. The method of claim 17, wherein the scheduling offset threshold corresponds to a minimum scheduling offset or a minimum applicable value.

19. The method of claim 17, wherein the scheduling offset threshold indicates a number of symbol periods defined in the second numerology.

20. The method of claim 17, wherein determining the beginning slot comprises:

converting the scheduling offset threshold to a second scheduling offset threshold in the second numerology, the scheduling offset threshold being defined in the first numerology; and determining the beginning slot based at least in part on the shared channel slot and second scheduling offset threshold.

21. The method of claim 17, further comprising:

receiving control signaling indicating a change to the scheduling offset threshold.

22. The method of claim 21, further comprising:

applying the change to the scheduling offset threshold in a slot occurring after the beginning slot.

23. The method of claim 17, further comprising:

receiving, via a second control channel of the first slot, a second cross-slot grant.

24. The method of claim 23, further comprising:

mapping a second ending symbol period of the second control channel to a second shared channel slot of the shared channel defined in the second numerology; and determining a second beginning slot defined in the second numerology based at least in part on the second shared channel slot and the scheduling offset threshold.

25. A method for wireless communications by a network entity, comprising:

transmitting control signaling that indicates a scheduling offset threshold corresponding to a cross-slot grant;

transmitting, in a first slot, the cross-slot grant in a control channel that has a first numerology that is different than a second numerology of a shared channel;

mapping an ending symbol period of the control channel to a shared channel slot of the shared channel defined in the second numerology, wherein the ending symbol period overlaps with the shared channel slot, wherein a duration of the shared channel slot is less than a duration of the first slot;

determining a beginning slot defined in the second numerology based at least in part on the shared channel slot and the scheduling offset threshold; and transmitting or receiving a data transmission during the beginning slot based at least in part on the cross-slot grant.

26. The method of claim 25, wherein the scheduling offset threshold corresponds to a minimum scheduling offset or a minimum applicable value.

27. The method of claim 25, wherein the scheduling offset threshold indicates a number of symbol periods defined in the second numerology.

28. The method of claim 25, wherein determining the beginning slot comprises:

converting the scheduling offset threshold to a second scheduling offset threshold in the second numerology, the scheduling offset threshold being defined in the first numerology; and determining the beginning slot based at least in part on the shared channel slot and second scheduling offset threshold.

29. The method of claim 25, further comprising:

transmitting control signaling indicating a change to the scheduling offset threshold.

30. The method of claim 29, further comprising:

applying the change to the scheduling offset threshold in a slot occurring after the beginning slot.

* * * * *